United States Patent [19]
Tohma et al.

[11] Patent Number: 5,549,936
[45] Date of Patent: Aug. 27, 1996

[54] MANUFACTURING METHOD OF MAGNETIC RECORDING MEDIUM

[75] Inventors: Kiyokazu Tohma, Hirakata; Kazunari Yoshimoto, Neyagawa; Ryuji Sugita, Hirakata; Tatsuaki Ishida, Sakai, all of Japan

[73] Assignee: Matsushita Electric Industrial Co., Ltd., Osaka-fu, Japan

[21] Appl. No.: 325,125

[22] Filed: Oct. 18, 1994

[30] Foreign Application Priority Data

Oct. 20, 1993 [JP] Japan ................... 5-262176
Nov. 17, 1993 [JP] Japan ................... 5-287946
Jul. 8, 1994 [JP] Japan ................... 6-156908

[51] Int. Cl.$^6$ .................................................. B05D 3/06
[52] U.S. Cl. .................... 427/566; 427/128; 427/131; 427/132; 427/251; 427/255.3; 427/294; 427/404; 427/419.2; 427/585
[58] Field of Search .................. 427/128, 132, 427/131, 566, 585, 251, 255.3, 294, 419.2, 404

[56] References Cited

U.S. PATENT DOCUMENTS

| | | | |
|---|---|---|---|
| 4,220,117 | 9/1980 | Shinohara | 118/718 |
| 4,323,629 | 4/1982 | Kunieda et al. | 428/457 |
| 4,450,186 | 5/1984 | Shinohara | 427/42 |
| 4,604,293 | 8/1986 | Shirahata et al. | 427/42 |
| 4,702,938 | 10/1987 | Yasunaga et al. | 427/132 |
| 4,746,542 | 5/1988 | Chino et al. | 427/131 |

FOREIGN PATENT DOCUMENTS

| | | |
|---|---|---|
| 57-133519 | 8/1982 | Japan . |
| 57-141027 | 9/1982 | Japan . |
| 59-022235 | 2/1984 | Japan . |

OTHER PUBLICATIONS

English Abstract of Japanese Patent Publication No. 59–022235, Feb. 4, 1984.
Sugita, "Co–Cr Perpendicular Magnetic Recording Tape by Vacuum Deposition"; IEEE Transactions On Magnetics, vol. 20, No. 5, Sep. 1984, pp. 687–692.

*Primary Examiner*—Bernard Pianalto
*Attorney, Agent, or Firm*—Greenblum & Bernstein P.L.C.

[57] ABSTRACT

In a manufacturing method of a magnetic recording medium with a vacuum deposition, two shielding members are provided above a substrate for defining an aperture. An evaporation source is located at a position wherein evaporated atoms from an evaporation material can adhere to a moving substrate through the aperture. The substrate is moved while a material in the evaporation source is irradiated at two evaporation portions with two electron beams along a moving direction of the substrate to form a magnetic layer. Thus, curving of columnar gains formed in the magnetic layer is suppressed or crystal orientation is enhanced, and magnetic read/write characteristics are improved. Further, a productivity is improved because the aperture can be enlarged than previously by using the two evaporation portions.

21 Claims, 17 Drawing Sheets

MANUFACTURING METHOD OF MAGNETIC RECORDING MEDIUM

BACKGROUND OF THE INVENTION

1. Field of the Invention

The present invention relates to a manufacturing method of a thin film magnetic recording medium.

2. Description of the Prior Art

A magnetic recording apparatus has been developed to deal with a higher recording density, and a magnetic recording medium superior in read/write characteristics at short wavelengths is demanded. At present, magnetic recording media used mainly are prepared by coating magnetic powders to a substrate, and characteristics of the magnetic media are improved to satisfy the above-mentioned demand. However, the improvement comes near limits on magnetic recording media prepared by coating magnetic powders to a substrate.

A thin film magnetic recording medium is developed to exceed the limits. A thin film magnetic recording medium is prepared by vacuum deposition, sputtering, plating or the like, and it has superior read/write characteristics at short wavelengths. Materials such as Co, Co—Ni, Co—Ni—P, Co—O, Co—Ni—O, Co—Fe—O, Co—Ni—Fe—O, Co—Cr, Co—Ni—Cr and the like are tried for a magnetic layer in a thin film magnetic recording media. As a material for a magnetic tape, a Co—O film and a Co—Ni—O film as a partially oxidized film are considered to be most Suitable, and a deposition tape including a magnetic layer made of Co—Ni—O is already available commercially.

Examples of prior art manufacturing methods of deposition tapes are explained below with reference to FIGS. 1 and 2. FIG. 1 shows an example of a continuous vacuum deposition apparatus for manufacturing a thin film magnetic recording tape. Evaporated atoms adhere obliquely to a substrate running on a cylindrical drum to form a magnetic layer. A substrate 100 made of a polymer material runs along a cylindrical drum 200 in a direction denoted with an arrow 101. Reference numerals 210 and 211 denote a supply roll and a winding roll for the substrate 100. Atoms evaporated from an evaporation source 20 adhere to the substrate to form a magnetic layer. An electron beam evaporation source is preferable for the evaporation source 20, and for example a Co-based alloy as an evaporation material 30 is filled therein. An electron beam evaporation source is used as evaporation materials such as Co having a high melting point at a high evaporation rate. Reference numeral 10 denotes an electron beam displayed schematically with an arrow. A material such as Co having a high melting point evaporates only at a position where the electron beam 10 irradiates, and it hardly evaporates except the position. Shielding plates 50 and 51 prevents for unnecessary evaporated atoms to adhere the substrate and to limit an incident range of evaporated atoms onto the substrate 100. Evaporated atoms passing an aperture defined by the shielding plates 50 and 51 arrive to the substrate 100 to form a magnetic layer. An incident angle of evaporated atoms is defined as an angle of the incident direction of an evaporated atom relative to a normal of the substrate 100. The shielding plate 50 defines an initial incident angle $\phi_i$ of evaporated atoms while the shielding plate 51 defines a final incident angle $\phi_f$. In an example, $\phi_i$ is 90° and $\phi_f$ is about 30°.

Columnar grains grow in a magnetic layer made of Co—O or Co—Ni—O prepared as explained above. As shown in FIG. 2, they grow obliquely and are curved. Therefore, an axis of easy magnetization is oblique relative to a normal of the plane of the magnetic layer.

On the other hand, FIG. 3 shows another example of a continuous vacuum deposition apparatus for manufacturing a thin film perpendicular magnetic recording tape. This example is similar to that shown in FIG. 1, except that the evaporation source 20 is provided vertically below a center of the cylindrical drum 200 for depositing evaporated atoms normally. Shielding plates 50' and 51' define an aperture for film growth or the initial and final incident angles $\phi_i$ and $\phi_f$ of evaporated atoms.

A characteristic of a magnetic layer produced by the apparatus shown in FIG. 3 is strongly uniaxial magnetic anisotropy perpendicular to the substrate. If a magnetic material used is an alloy such as Co—Cr, the anisotropy comes mainly from magnetocrystalline anisotropy. The crystallinity and magnetic characteristics depend strongly on the initial incident angle $\phi_i$ of evaporated atoms to the substrate 100. Therefore, it is necessary to decrease the incident angle to 0° as much as possible. However, productivity on preparing a magnetic layer increases with increase in the length of the aperture. Then, for example $\phi_i$ is set $-10°$ and $\phi_f$ is set $10°$. When a magnetic recording tape of Co—O is produced, Co as an evaporation material is filled in the evaporation source 20. The initial and final incident angles are set similarly to a case of Co—Cr alloy.

In Co—Cr and Co—O magnetic layers produced as explained above, columnar grains grow on the substrate 100, and an axis of easy magnetization thereof align generally along a normal of the film plane. However, columnar gains in the magnetic layers are curved as shown in FIG. 4, and this curving is a large factor to deteriorate uniformity of magnetic anisotropy of a magnetic layer.

SUMMARY OF THE INVENTION

An object of the present invention is to provide a manufacturing method of a magnetic recording medium superior on high density recording characteristics.

In the present invention, two evaporation portions are provided in an evaporation source along a running direction of a substrate for depositing evaporated atoms from the evaporation source in vacuum deposition. Evaporated atoms from the two evaporation portions adhere to the substrate through an aperture defined by two shading members to form a magnetic layer thereon. By providing the two evaporation portions, curving of columnar grains in the magnetic layer is suppressed, crystallinity is enhanced, and magnetic anisotropy energy of the film increases. Further, a productivity is increased because an aperture can be enlarged than previously. Thus, a magnetic recording medium having superior high density recording characteristics can be manufactured at a high productivity. Further, on manufacturing a magnetic recording medium including a magnetic oxide layer, by introducing oxygen at an end point of film deposition region as well as a start point thereof, a magnetic recording medium having superior high density recording characteristics can be manufactured at a high productivity. By providing two evaporation resources, a magnetic layer of two-layer structure can be manufactured in a one-turn a substrate between rolls, and a two-layer structure produced by using the two evaporation makes it possible to manufacture a magnetic recording medium having better characteristics at a high productivity.

An advantage of the present invention is that a magnetic recording medium having superior high density recording characteristics can be manufactured.

Another advantage or the present invention is that a magnetic recording medium can be manufactured at a high productivity.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 5:
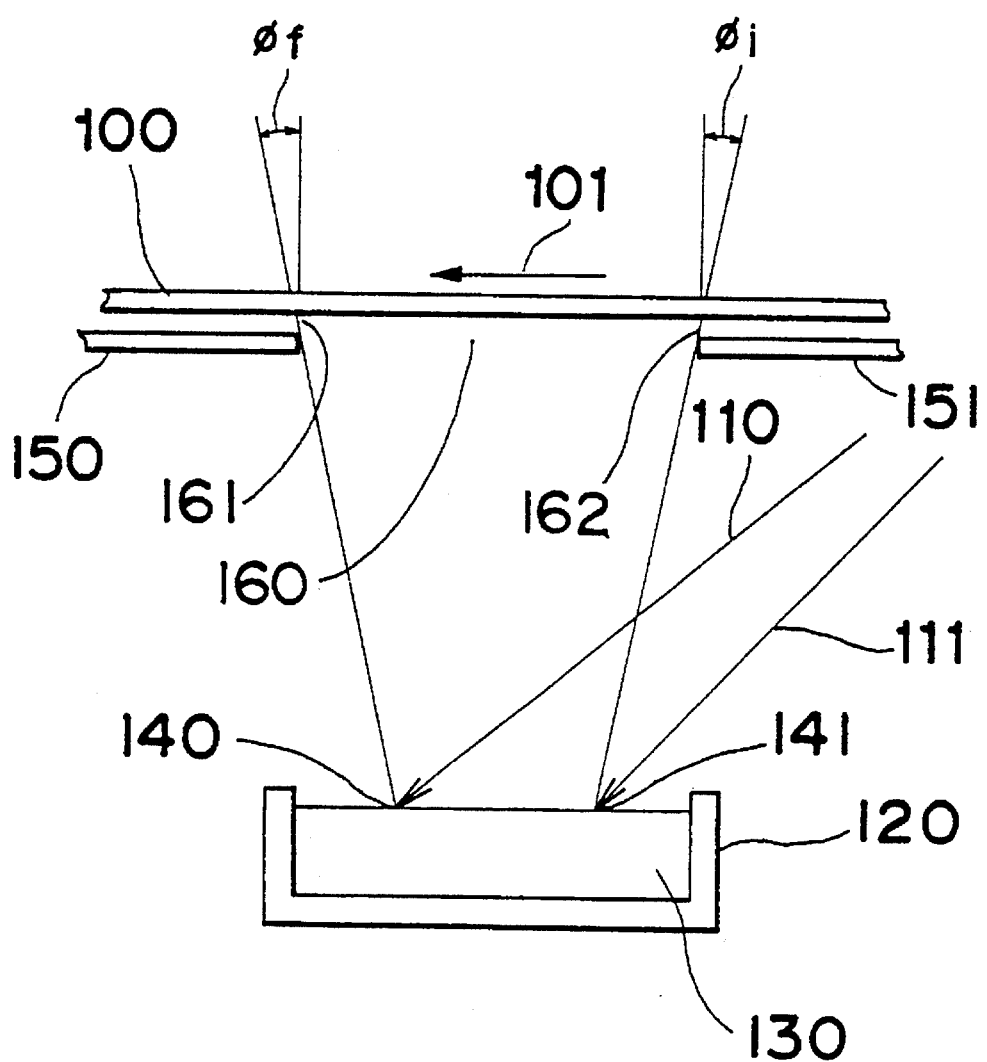
FIG. 5 is a sectional of a main part of a vacuum deposition apparatus near an evaporation source for illustrating a relation of two evaporation portions to a substrate which is a feature of a manufacturing method of magnetic recording medium of the invention.

Referring now to the drawings, wherein like reference characters designate like or corresponding parts throughout the several views, FIG. 5 shows a part of a vacuum deposition apparatus of an embodiment in a vacuum chamber near an evaporation source 120 for illustrating a basic concept of the invention where two evaporation portions are provided against a substrate. It is a feature of a manufacturing method of a magnetic recording medium of the invention to provide two evaporation portions in an evaporation source.

In the apparatus, a substrate 100 runs along a direction of an arrow 101 relative to an evaporation source 120. Though the substrate 100 is drawn to run horizontally for convenience of drawing, it runs actually obliquely or like an arc. The substrate 100 runs along a belt or a cylindrical drum (not shown) which carries it. The substrate 100 is made of, for example, a polymer film such as a polyethylene telephthlate film, a polyimide film, a polyamide film, a polyether imide film or a polyethylene naphthalate film or a polymer film on which an underlayer is formed.

An evaporation material 130 is filled in the evaporation source 120. The material 130 is made of Co or a Co-based alloy. An electron beam from an electron gun irradiates the material 130 to heat, melt and evaporate it. Because a material such as Co has a high melting point, it evaporates at a portion irradiated by the electron beam while it nearly evaporates at the remainder thereof. Therefore, a portion 140, 141 at which the electron beam 110, 111 irradiates is denoted as an evaporation portion in the invention.

Two electron beams 110 and 111 are displayed in FIG. 5. Such two electron beams may be generated by two electron guns. However, it is very convenient and practicable to generate two electron beams by controlling one electron gun. That is, two conventional evaporation sources can be replaced easily by using a combination of one electron gun and one evaporation source. On the contrary, when two evaporation sources are arranged along the running direction 101 of the substrate, it is difficult to narrow a distance between them because of sizes of evaporation sources available, and advantages of the invention cannot be realized.

Atoms evaporated from the evaporation portions 140, 141 are deposited with a certain distribution on the substrate 100 in an aperture 160 defined by shielding plates 150 and 151, and a magnetic layer (not shown) is formed over the aperture. In order to prevent unnecessary atoms to arrive at the substrate 100, the shielding plates 150, 151 are provided above the substrate 100. In the embodiment shown in FIG. 5, the two shielding plate 150 and 151 are provided. In this case, the shielding plate 151 defines incidence of evaporated atoms on the substrate at a start point 162 of the aperture 160 for film deposition along the running direction 101 of the substrate 100, while the shielding plate 150 defines incidence at an end point 161 of the aperture 160.

The incident angle of evaporated atoms to the substrate 100 is defined as an angle between a normal of the substrate and an incidence direction of evaporated atoms. An incident angle of a particular point onto a substrate 100 varies with running of the substrate 100. In the present invention, the two evaporation portions 140 and 141 are provided in the evaporation source 120. Then, it is a question how to define incident angle. As shown in FIG. 5, initial incident angle $\phi_i$ is defined as an incident angle of evaporated atoms from the evaporation portion 141 in the upstream side along the running direction 101 of the substrate 100, and it is restricted by the shielding plate 151 provided in the upstream side. On the other hand, final incident angle $\phi_f$ is defined as an incident angle of evaporated atoms from the evaporation portion 140 in the downstream side along the running direction 101 of the substrate 100, and it is restricted by the shielding plate 150 provided in the downstream side. Strictly speaking, an actual incident angle of evaporated atoms is different from the above-mentioned definition. For example, because evaporated atoms from the evaporation portion 140 in the downstream side also fly to the shielding plate 151, the initial incident angle is higher than the definition $\phi_i$, while because evaporated atoms from the evaporation portion 141 in the upstream side also fly to the shielding plate 150, the final incident angle is lower than the definition $\phi_f$. However, evaporated atoms from the evaporation portion 141 play a dominant role around the start point 162 in the aperture, while those from the evaporation portion 140 play a dominant role around the end point 161. If the incident angle is equal to each other, characteristics of a film prepared by using two evaporation portions 140, 141 are similar to those prepared with one evaporation portion. However, if the distance between the evaporation portions 140, 141 is appropriate, there arises a remarkable difference between characteristics of the two films, as will be explained later.

If one electron beam or one evaporation portion is used as in prior art, a distance or an aperture between the shielding plates 150 and 151 has to be narrowed in order to provide an incident angle between $\phi_i$ and $\phi_f$ shown in FIG. 5. This shows clearly that if two evaporation portions 140 and 141 are provided along the running direction 101 of the substrate, deposition is not restricted by a position relation of the evaporation portions 140, 141 with the substrate 100, and any position relation can cause high productivity than previously, and this is very advantageous. It is to be noted that the distance between the two evaporation portions 140 and 141 is adjusted appropriately to produce a film of desired characteristics.

If an evaporation portion in an evaporation source is extended along the running direction of the substrate, evaporation rate becomes highest at a center of the evaporation portion, quite different from the invention using two evaporation portions. However, if an electron beam is controlled to separate an evaporation portion having highest evaporation rate towards two sides to form two evaporation portions having higher evaporation rates, this arrangement is included in the invention.

Figure 6:
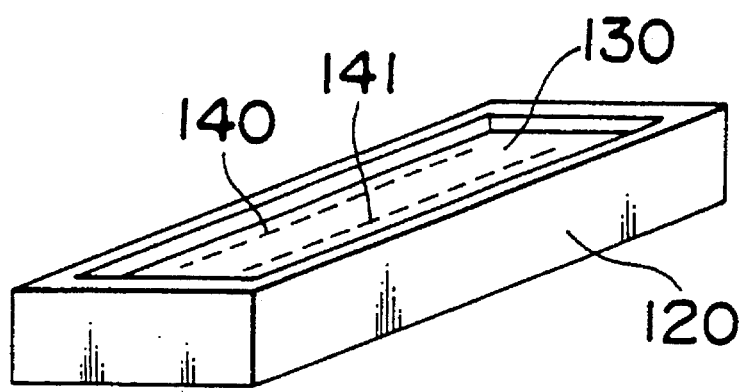
FIG. 6 is a perspective view of an evaporation source having two evaporation portions.

Though FIG. 5 is a sectional view which does not show a width of the substrate, the width is usually 50 cm or more in an actual deposition apparatus, as shown in a perspective view of FIG. 6. In this case, the evaporation source has a long shape in a direction perpendicular to a surface of a sheet of paper on which FIG. 5 is drawn. That is, as shown as dashed lines in the evaporation source shown in FIG. 6, the evaporation portions 140 and 141 are extended in a width direction. Such a state of the evaporation source 120 can be realized easily by scanning an electron beam from the electron gun.

If one electron gun is used to perform such scan, there exist periods when the electron beam transfers from the evaporation portion 140 to 141 and vice versa. Therefore, it is necessary to shorten an irradiation time needed for the transfer than the irradiation times at the evaporation portions 140 and 141. Then, the evaporation rates at the evaporation portions 140 and 141 become higher than the transfer region.

Next, several embodiments of manufacturing methods are explained in detail.

Figure 7:
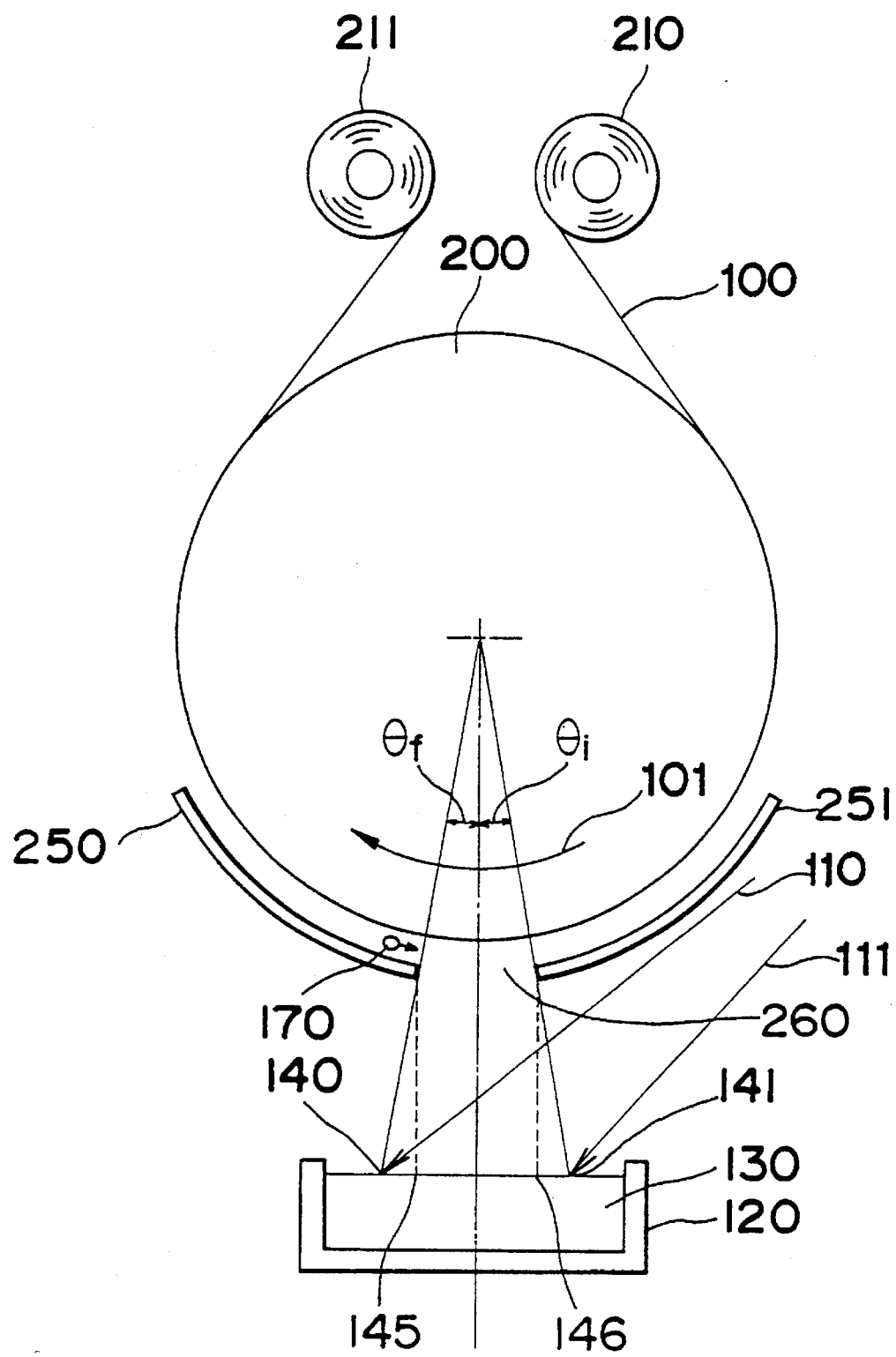
FIG. 7 is a sectional view of a vacuum deposition apparatus inside a vacuum chamber used for a manufacturing method of magnetic recording medium for a second embodiment of the invention.

FIG. 7 is a schematic view of a continuous vacuum deposition apparatus for a second embodiment. A thin film magnetic recording medium comprising, for example, a Co-based material including Co and Cr or Co, Ni and Cr as main components is produced for perpendicular magnetic recording. When a thin film magnetic recording medium for perpendicular magnetic recording is produced by using the above-mentioned material, the initial incident angle is important for the read/write characteristics, while the final incident angle is important for reliability.

A feature of the above-mentioned magnetic recording medium is strongly uniaxial magnetic anisotropy perpendicular to the substrate. The uniaxial anisotropy is mainly ascribed to crystalline magnetic anisotropy. Crystallinity and magnetic characteristics of the film depend strongly on the initial incident angle. Therefore, it is necessary to decrease the initial incident angle to 0° as much as possible (normal incidence) so as to align c-axes of columnar grains highly in the film normal.

On the other hand, the final incident angle affects not the crystallinity so much, but reliability. If the final incident angle increases, a packing factor of evaporated atoms around a surface of a film decreases to deteriorate a mechanical strength of the film. In order to get reliable mechanical strength, it is needed to decrease the final incident angle.

Previously, when a film is grown, an aperture has to be narrowed to satisfy both crystallinity and mechanical strength of a film, while this sacrifices productivity. On the contrary, the invention satisfies the two problems by providing a wide aperture for film growth.

FIG. 7 is explained further in detail. A substrate 100 made of a polymer material runs along a cylindrical drum 200 in a direction denoted with an arrow 101. Reference numerals 210 and 211 denote a supply roll and a winding roll for the substrate 100. An evaporation source 120 extends widely along the running direction 101 of a substrate 100, and it is provided vertically just below a center of a cylindrical drum 200. The evaporation source 120 also extends in a width direction of the substrate 100 as shown in FIG. 6. Two evaporation portions 140 and 141 are provided in the evaporation source 120 outside points 145 and 146 which are vertical projections of two ends of an aperture 260 defined by two shielding plates 250 and 251. That is, one of the evaporation portions 140 is provided in the downstream side along the running direction 101 with respect to the point 145, while the other 141 is provided in the upstream side along the running direction 101 with respect to the point 146. The evaporation portions 140 and 141 are irradiated by electron beams 110 and 111, respectively.

In the above-mentioned structure, oblique incident vapor from the two evaporation portions arranged at two sides and having high evaporation rates arrive at the substrate 100 in parallel to the normal of the substrate 100 running along a peripheral of the cylindrical drum 200. Thus, this method makes it possible to make effective incident angle about 0° from initial to final incidence even though the aperture is wide. Thus, columnar grains grow without curving substantially though the aperture is wide, having high crystallinity and good mechanical strength.

If a Co-based magnetic material of a magnetic layer is a magnetic material having oxygen as a main component such as Co and O or Co, Ni and O, it is said that shape magnetic anisotropy contributes to the anisotropy than magnetocrystalline anisotropy. In such a case, the present method does not grow curved columnar grains so that forms an excellent film having small distribution of magnetic anisotropy. When a magnetic layer made of Co and O or Co, Ni and O is formed, materials filled in the evaporation source comprises Co or Co and Ni, and oxygen is introduced separately into a vacuum chamber to form a magnetic layer by a reaction deposition process.

By using the manufacturing apparatus of magnetic tape of an example of the second embodiment, a Co—Cr film is prepared. The Co—Cr is a material which has attracted attention as suitable for a magnetic layer for a perpendicular magnetic recording medium. A polyimide film of tape thickness of 10 μm is used as the substrate 100. A diameter of the cylindrical drum 200 is 1 m. A temperature of the drum 200 is set at 250°. A width of the evaporation source 120 is 40 cm, and it is located by 80 cm below the center of the cylindrical drum 200. The aperture 260 between the shielding plates 250 and 251 is set as shown in FIG. 7, wherein $\Theta_i$ and $\Theta_f$ denote angles relative to a vertical line from the center of the cylindrical drum 200, and this is a measure of an aperture range in the same system. In the present embodiment, $\Theta_i$ is set $-10°$ and $\Theta_f$ is set $10°$. A Co—Cr alloy is filled as an evaporation material in the evaporation source 120, and it is melted by an electron beam of 70 kW. By controlling a scan of the electron beam, a distance between the evaporation portions 140 and 141 is set about 30 cm. The running speed of the substrate 100 is controlled to form a film of a Co—Cr film of thickness of about 0.2 μm. On the other hand, on preparing a comparison example, a scan of the electron beam is controlled to use only one evaporation source just below the center of the cylindrical drum 200 vertically and a Co—Cr film is grown.

Figure 4:
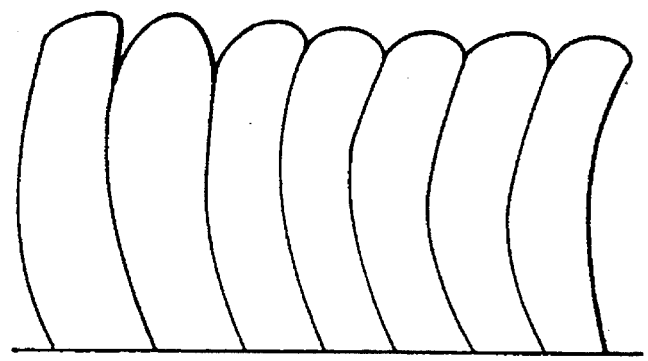
FIG. 4 is a schematic sectional view of a magnetic film prepared with the apparatus shown in FIG. 3.
Figure 3:
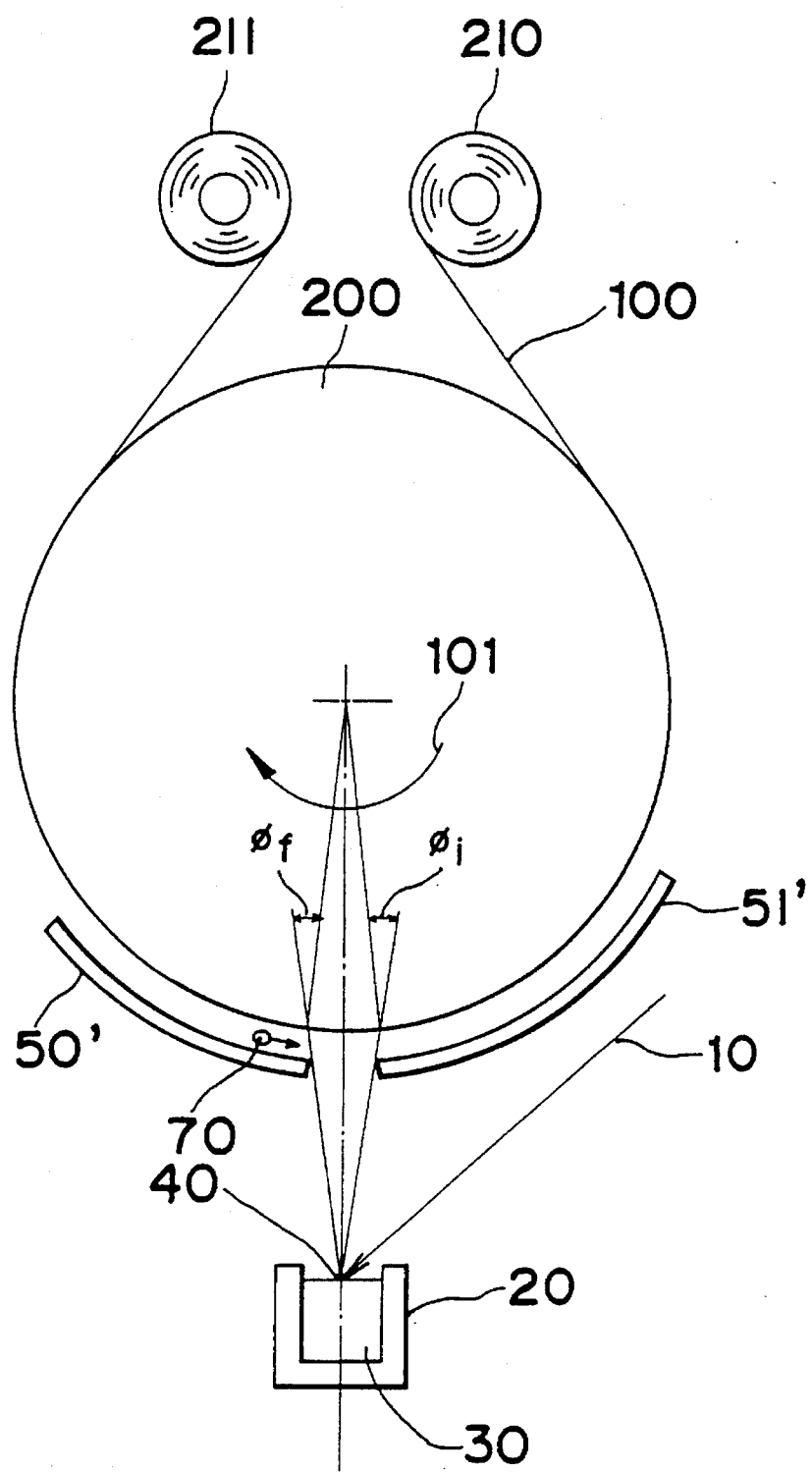
FIG. 3 is a schematic diagram of a prior art deposition apparatus for normal incidence deposition of a magnetic layer.
Figure 8:
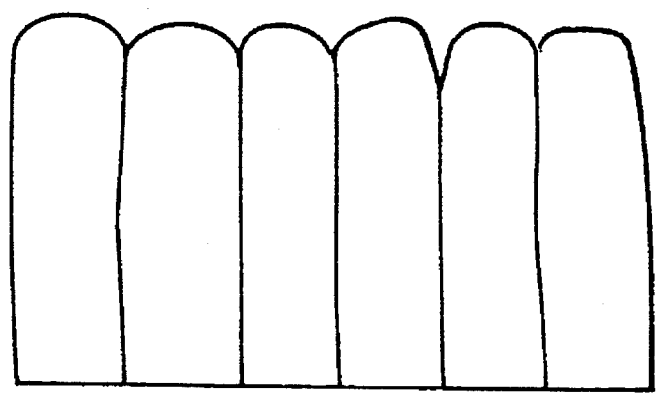
FIG. 8 is a sectional view of a structure of columnar gains prepared with normal incidence deposition in a magnetic layer prepared with the apparatus shown in FIG. 7.

The degree of the c-axis orientation is evaluated by using X-ray diffraction.. A half-width of rocking curve on (002) plane is measured for the evaluation. The half-width of the Co—Cr film formed by this example of the embodiment is about 5°, while that of the comparison example is about 12°. This shows that the Co—Cr film formed by the embodiment has superior crystal orientation. In the comparison example using one evaporation source, $\Theta_i$ to be 4° or smaller and for $\Theta_f$ of $-4°$ or larger are found necessary to get a half-width of about the same as that of the embodiment. This means that a state of substantially normal incidence is realized even though the aperture is wide. FIGS. 8 and 4 show this more clearly. These drawings show columnar grains in a magnetic layer; FIG. 8 relates to the example of the embodiment, while FIG. 4 relates to the comparison example. In the example of the embodiment shown in FIG. 8, columnar grains grow almost linearly because the incident angle nearly changes from a start to an end of crystal growth.

If productivity is evaluated by the running speed of the substrate 100, the comparison example is faster by about 20% than the embodiment. However, when a narrow aperture is used to produce crystal orientation similar to the embodiment, the speed has to be decreased to about a third of the case of the original aperture.

Next, a partially oxidized Co film is formed by using the similar structures of the example of the second embodiment and the comparison example with the manufacturing apparatus of a magnetic recording medium of the embodiment of the invention. The partially oxidized Co film has also attracted attention as a magnetic layer for a perpendicular magnetic recording medium, similarly to a Co—Cr film. The temperature of the cylindrical drum 200 is set at room temperature. A polyethylene telephthalate film of thickness of 7 μm is used as the substrate 100. Only Co as an evaporation material is filled in the evaporation source 120. In order to form a partially oxidized film, oxygen is introduced into the vacuum chamber through a nozzle 170 provided near an end of the shielding plate 250. An arrow described near the nozzle 170 denotes a direction of oxygen flow from the nozzle 170 (arrows which will be described near nozzles for introducing oxygen in drawings explained below also denote a direction of oxygen flow).

Partially oxidized Co films of the example of this embodiment and the comparison example are evaluated by a magnetic anisotropy energy $K_u$ which can be obtained from a torque curve measurement with a torque magnetometer. The partially oxidized Co film of the invention has $K_u$ of $2.3 \times 10^6$ erg/cc, while that of the comparison example has $K_u$ of $1.9 \times 10^6$ erg/cc. In the comparison example using one evaporation source, $\Theta_i$ to be 5° or smaller and for $\Theta_f$ of $-5°$ or larger are found necessary to get $K_u$ of about the same as that of the example of the embodiment. This means that a state of substantially normal incidence is realized even though the aperture is wide.

If mechanical strength is evaluated with a still resistance time, the partially oxidized Co film of the example of the embodiment has a time two or more times that of the film of the comparison example. The still resistance time is measured as a time when an output of the medium formed as a tape decreased by 3 dB from the initial value on reproducing an image in a stall state in a commercial VCR deck. For a film of the example of the embodiment, the still time is 60 minutes or more, while for a film of the comparison example, it is 35 minutes. This excellence of a film of the example of the embodiment is ascribable to difference in the shapes of columnar grains as shown in FIGS. 8 and 4 for Co—Cr film.

In the above-mentioned embodiment, a normal incidence deposition is explained. On the other hand, several approaches of two evaporation portions explained below uses two evaporation sources for oblique incidence deposition.

Figure 9:
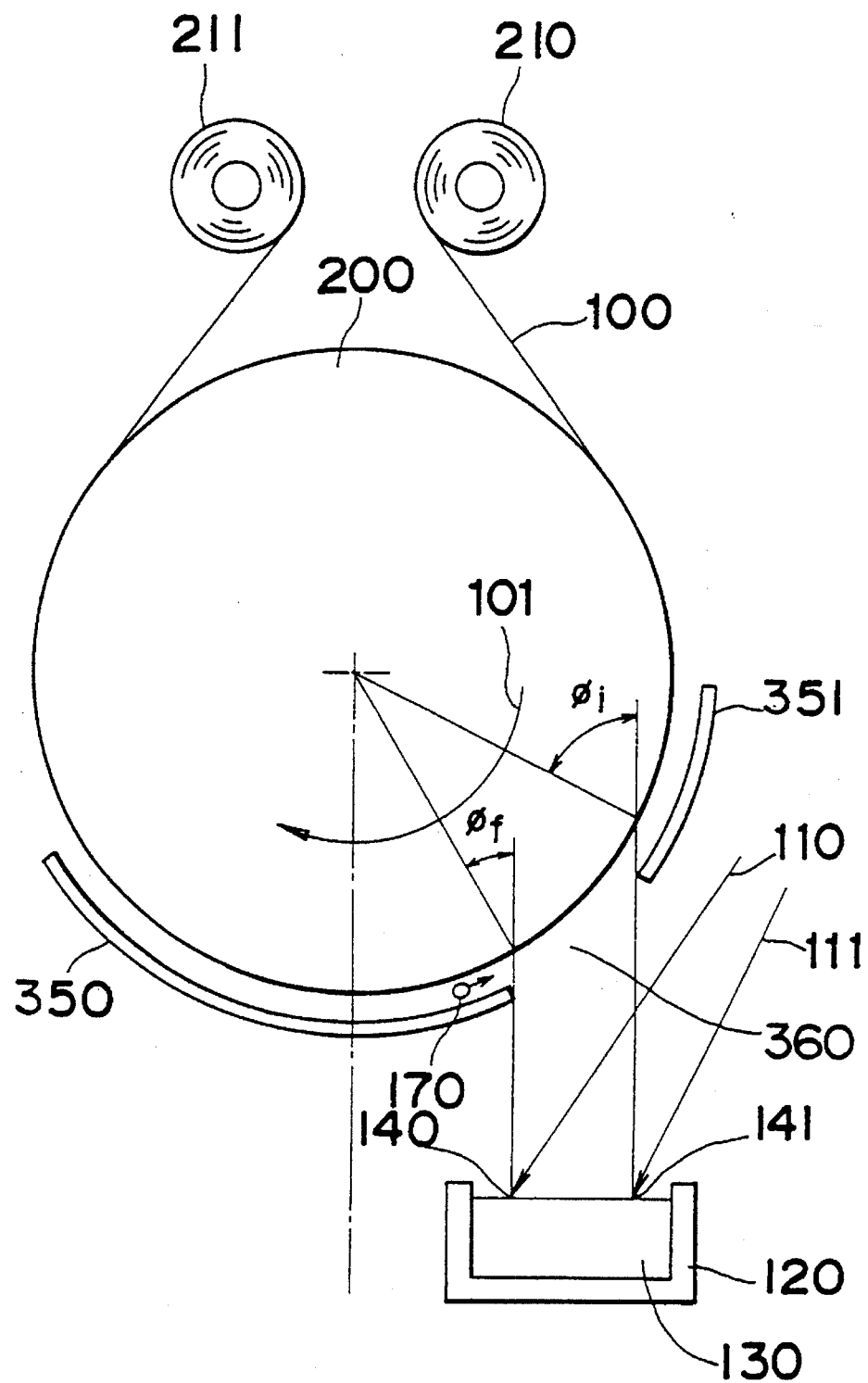
FIG. 9 is a sectional view of a vacuum deposition apparatus inside a vacuum chamber used for a manufacturing method of magnetic recording medium for a third embodiment of the invention.

An approach of two evaporation portions to oblique incidence deposition is explained with reference to FIG. 9, which shows schematically a vacuum deposition apparatus inside a vacuum chamber used for a manufacturing a magnetic recording medium for a third embodiment of the invention. A mechanism on the running of a substrate 100 is similar to that shown in FIG. 7. An evaporation source 120 is provided at the upstream side in a running direction of the substrate 100 with respect to a vertical line just below a center of a cylindrical drum 200. Two evaporation portions 140 and 141 are provided on a vertical line through an end of film growth restricted by a shielding plate 350 and on a vertical line through an end of film grouch restricted by another shielding plate 351, respectively. A nozzle 170 for introducing oxygen into the vacuum chamber is arranged near an end of the shielding plate 350.

A width of an aperture 360 defined between the shielding plates 350 and 351 can be broadened when a magnetic layer is formed by running the substrate 100 in the vacuum deposition apparatus. If compared with growth in the prior art apparatus shown in FIG. 1, the width of the aperture 360 between the shielding plates 350 and 351 can be broadened when the same values of $\phi_i$ and $\phi_f$ as those used in the prior art shown in FIG. 1. In FIG. 9, $\phi_i$ and $\phi_f$ are measured as follows: $\phi_i$ is defined as an angle between a line connecting a center of the evaporation portion 141 at a start point of film growth process and a radius of the cylindrical line through the start point, while $\phi_f$ is defined as an angle between a line connecting a center of the evaporation portion 140 at an end point of film growth process and a radius of the cylindrical lane through the end point. It is confirmed experimentally that the $\phi_i$ and $\phi_f$ measured as explained above correspond to the $\phi_i$ and $\phi_f$ shown in FIG. 1. That is, a magnetic layer manufactured by the vacuum deposition apparatus shown in FIG. 9 of the invention has about the same magnetic properties and read/write characteristics as that manufactured by the prior art vacuum deposition apparatus shown in FIG. 1 if $\phi_i$ and $\phi_f$ are set to have the same values respectively in the two cases.

An advantage of improving the productivity of the invention does not depend of the evaporation rate of the evaporated atoms from the evaporation portions 140 and 141. However, a higher S/N ratio can be obtained by enhancing the evaporation rate at the evaporation portion 140 at the side of the start point of the aperture 360 than that at the evaporation portion 141 at a side of the end thereof, than a case having the same evaporation rates for the two evaporation portions. We believe that the crystalline alignment of a magnetic layer is higher if a film deposition rate at the start of the aperture 360 is higher.

A magnetic layer is produced by using Co, Co—Ni, Co—Cr, Co—Ni—Cr, Co—Fe, Co—Ni—Fe or the like as an evaporation material by using the above-mentioned methods. Thus, a magnetic tape having superior magnetic read/write characteristics can be prepared at a high productivity.

Examples of this embodiment are explained below, and read/write characteristics of a deposition tape prepared with the method of the invention is compared with those of a deposition tape prepared with the prior art method. In a first example of the third embodiment, a deposition tape is produced by using the vacuum deposition apparatus having a basic structure as shown in FIG. 9. A diameter of the cylindrical drum is 1.5 m. A polyethylene telephthalate film of tape thickness of 7 μm is used as the substrate 100, and cobalt is used as the evaporation material 130. A distance between the evaporation portions are set to be 10 cm. The shielding plates 350 and 351 are arranged to have $\phi_i$ of 80° and $\phi_f$ of 60°. A width of the aperture 360 between the shielding plates 351 and 350 is set to be 25 cm. In the structure explained above, an average deposition rate is set to be 0.3 μm/s, and a magnetic layer of film thickness of 0.1 μm is formed. Oxygen is introduced at a ratio of 0.8 liter/min from the nozzle 170. The running speed of the substrate 100 is controlled to be 45 m/min.

In a second example of the third embodiment, a magnetic tape is produced in a condition that the evaporation rate from the evaporation portion 141 is set to be 1.5 times that from the evaporation portion 140. The other conditions than the evaporation rate are set to be same as those in first example. The evaporation rate is controlled so that the irradiation time of an electron beam from the electron gun is longer at the first evaporation portion 141 than at the second one 140. A width of an aperture between the shielding plates 350 and 351 is set to be 25 cm, and the running speed of the substrate on deposition is set to be 45 m/min.

A magnetic tape of a comparison example is also prepared by using a prior art method. The vacuum deposition apparatus is the same as that explained above except that only one evaporation portion is provided as in the prior art shown in FIG. 1. In the comparison example, $\phi_i$ is set to be 82° and $\phi_f$ is set to be 60°, as in the above-mentioned example. In this setting, the width between the shielding plates 350 and 351 is needed to be set to be 17 cm. In this apparatus, an average deposition rate is set to be 0.3 μm/s, and a magnetic layer of film thickness of 0.1 μm is formed. Oxygen is introduced at a ratio of 0.8 liter/min from the nozzle 170. The running speed of the substrate 100 is controlled to be 31 m/min, much slower than the above-mentioned example of the embodiment.

A magnetic recording medium produced as explained above is cut to form tapes, and read/write characteristics of the tapes are evaluated with a ring magnetic head of gap length of 0.15 μm made from Sendust. Then, it is found that a magnetic tape produced by using the prior art method is generally similar to a magnetic tape produced in the first example of the embodiment on an output and noise level. On the other hand, a magnetic tape produced in the second example has a higher output of +1.5 dB at recording wavelength of 0.5 μm than a magnetic tape produced in the first example of the embodiment. As explained above, a magnetic tape can be produced with the method of the third embodiment of the invention at a much higher productivity than with the prior art method though the former tape has S/N ratio similar to the latter tape.

In the above-mentioned examples, cobalt is used as the evaporation material. However, advantages similar to the above-mentioned examples can be obtained by using an alloy such as Co—Ni, Co—Fe, Co—Ni—Fe, Co—Cr or Co—Ni—Cr as the evaporation material.

When a thin film magnetic recording medium made from a Co-based magnetic material including mainly cobalt and oxygen or cobalt, nickel and oxygen with oblique incidence deposition, it is needed to control shape magnetic anisotropy mainly as explained above. Anisotropy of the magnetic layer produced with oblique incidence deposition is due to oblique anisotropy, so that it is required to make an easy axis of magnetization have a desired angle and to suppress distribution of anisotropy to a less level. In order to solve this requirement, a solution is to narrow the incidence range. However, this sacrifices productivity in the prior art. This invention satisfies the above-mentioned requirement as well as the productivity.

A different approach of two evaporation portions in oblique incidence deposition is explained with reference to FIG. 10 which shows schematically a vacuum deposition apparatus inside a vacuum chamber used for a manufacturing method of magnetic recording medium of a fourth embodiment of the invention. A running mechanism of the substrate 100 is similar to that shown in FIG. 9, while a position of the evaporation source 120 is similar to that shown in FIG. 9. A feature of FIG. 10 different from that of FIG. 9 is that an evaporation portion 140 is provided outside a point 245 projected from an end of the shielding plate 350 facing the aperture. That is, the evaporation portion 140 is provided outside the point 245 which is a projection of the end of the shielding plate 350 facing the aperture. That is, the evaporation portion 140 is provided in downstream side relative to the point 245 in the running direction of the substrate. Then, $\phi_f$ becomes larger than the case shown in FIG. 9 where the evaporation portion 140 is located at the point 245. By forming a film as explained above, curving of columnar gains can be suppressed. That it, a change in incident angle from the start point to the end point for film deposition is suppressed, and a film having columnar gains of more linear shapes can be formed. It is desirable on forming a film that evaporation rate is set to be higher at the evaporation portion 140 than at the evaporation portion 141. By providing two evaporation portions, it becomes possible to provide a wider aperture 360 defined between the shielding plates 350 and 351, and this is advantageous for improving productivity.

Distribution of magnetic anisotropy in a film produced as explained above is small. This is very advantageous in order to improve read/write characteristics. It is also a characteristic that a smaller amount of oxygen is needed to be introduced. In the prior art method, the deposition rate of a film is higher at the end point having a low incident angle. In order to increase coercive force of such a film, it is needed to supply a large amount of oxygen at the end portion of film deposition. However a large amount of oxygen has a large effect to scatter atoms for forming the film, and this decreased a packing factor of the film as well as surface characteristic of the film. On the contrary, in the invention, the film is formed only at a desired incident angle, so that desired magnetic characteristics can be realized with a small amount of oxygen. If an amount of oxygen to be introduced is small, the packing factor of the film does not decrease remarkably even at a higher incident angle. This is advantageous for reliability including etching resistance. Further, because its surface is smooth, a spacing loss becomes low favorably.

Figure 10:
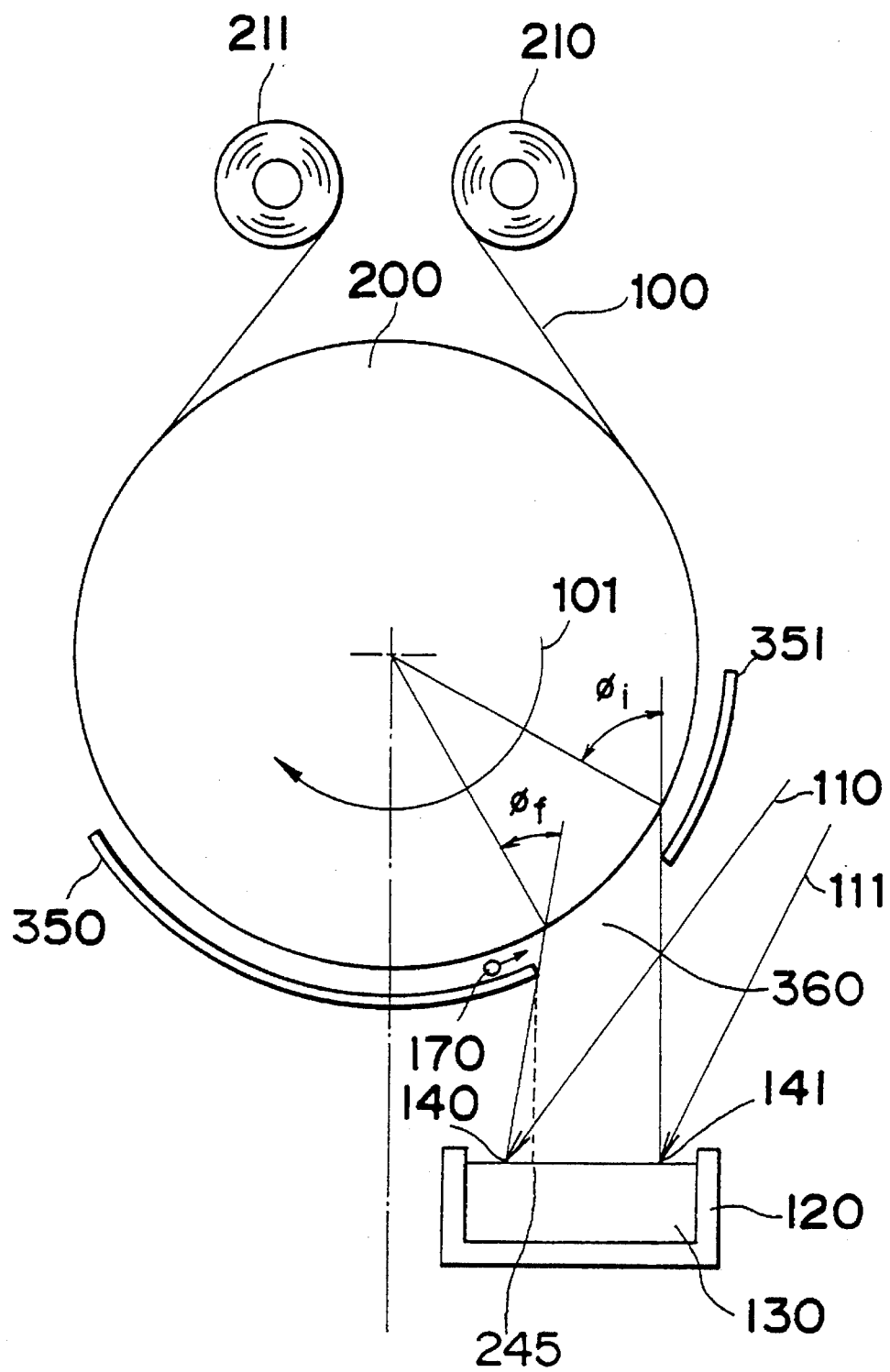
FIG. 10 is a sectional view of a vacuum deposition apparatus inside a vacuum chamber used for a manufacturing method of a magnetic recording medium for a fourth embodiment of the invention.
Figure 11:
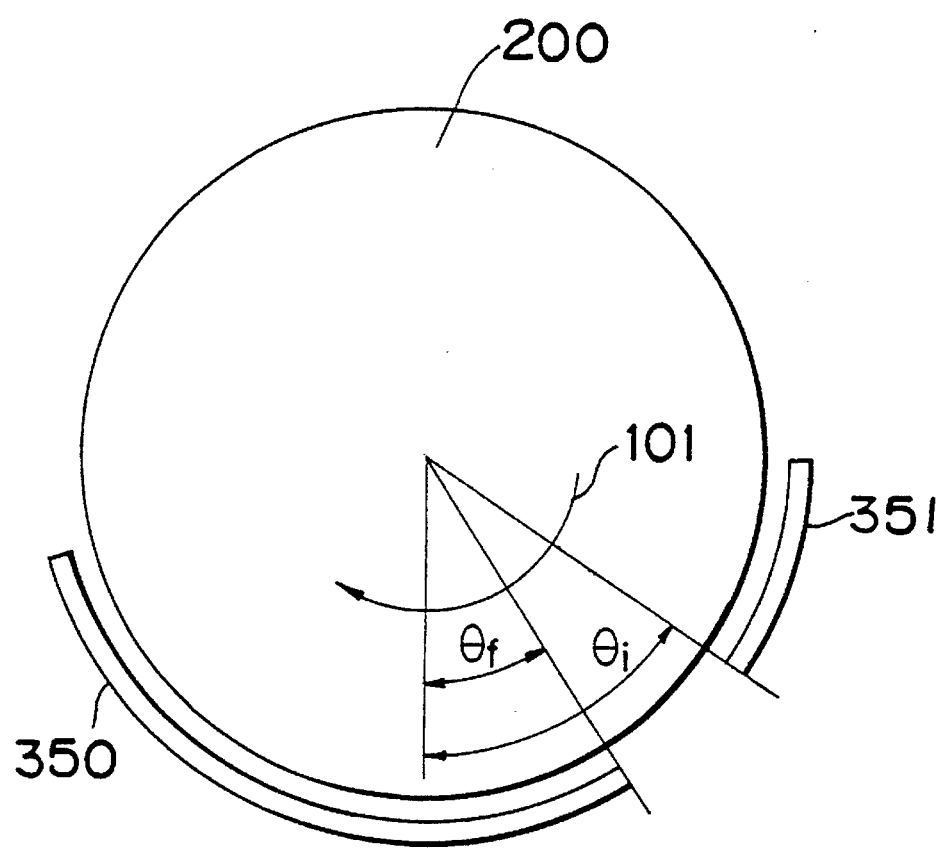
FIG. 11 is a schematic sectional view of a cylindrical drum and shielding plates for illustrating the setting of the shielding plates.

A deposition tape of a first example of the embodiment is produced by using the vacuum deposition apparatus for the embodiment shown in FIG. 10. A polyethylene telephthalate film of tape thickness of 7 μm is used as the substrate 100. A diameter of the cylindrical drum is 1 m. The temperature of the cylindrical drum 200 is set at room temperature. The evaporation source 120 has a width set to be 35 cm along the running direction of the substrate, while it is arranged vertically at 60 cm below a center of the cylindrical drum 200. A position of a center of the evaporation source 120 is 37 cm relative to a vertical line from the center of the cylindrical drum 200 in upstream side along the running direction of the substrate. The evaporation portions 140 and 141 are provided at about 10 cm relative to the center of the evaporation source 120 in downstream side and in upstream side along the running direction of the substrate. The shielding plates 350 and 351 are arranged to have $\Theta_i$ of 70° and $\Theta_f$ of 40°, as shown in FIG. 11. The shielding plate 351 has its inner surface set by 1 cm above the surface of the cylindrical drum 200 and its outer surface set by 2 cm above the surface. In the structure explained above, the evaporation portion 141 is located vertically below an end of the shielding plate 351 defining a start point of film deposition. The evaporation portion 140 is located by about 7 cm in downstream side from the point 245 along the running direction of the substrate 100. In this case, the initial incident angle $\phi_i$ is about 73° and the final one $\phi_f$ is about 62°. Cobalt is filled in the evaporation source 120, and it is melted with an electron beam of 70 kW. Oxygen is introduced into the vacuum chamber with the nozzle 170 in order to produce a partially oxidized film. The running speed of the substrate 100 is controlled to form a film of a partially oxidized film of thickness of about 0.15 μm.

In a comparison example of magnetic tape, an electron beam is stopped to irradiate the evaporation portion 140 and irradiates only the evaporation portion 141 to form a partially oxidized cobalt film. In order to realize a saturation magnetization similar to that of the film of the example of the fourth embodiment, it is needed to supply oxygen of an amount four times that of the example of the embodiment.

The partially oxidized Co films of the first example of this embodiment and the comparison example are evaluated by a magnetic anisotropy energy $K_u$. The partially oxidized Co film of the embodiment has $K_u$ of $2.8 \times 10^6$ erg/cc, while that of the comparison example has $K_u$ of $1.4 \times 10^6$ erg/cc. An easy axis of magnetization can also be evaluated from a torque curve. In the film of the embodiment, the easy axis is about 65° relative to the film normal, while it is about 50° relative to the film normal in the comparison example. In the comparison example using one evaporation source, $\Theta_f$ shown in FIG. 11 is increased to increase $K_u$. However, $K_u$ of about the same as that of the example of the embodiment cannot be obtained. That is, when $\Theta_f$ is between 40° and 55°, $K_u$ increases gradually, but it decreases when $\Theta_f$ increased further. This may be ascribed to deposition of scattered evaporated atoms to the substrate which cannot be neglected when the aperture width is narrowed because the shielding plate restricting the incident angle is far away from the surface of the cylindrical drum.

A second example of a partially oxidized cobalt film is formed in the same conditions as the above-mentioned first example by using 2:1 of a ratio of an irradiation time of the electron beam at the evaporation portion 140 to that at the evaporation portion 141. The film of the second example prepared in this method has $K_u$ of $3.0 \times 10^6$ erg/cc which is better than that of the first example. This is ascribable to an increase in effective incident angle compared with the first example because evaporation rate at the evaporation portion 140 becomes larger than that at the evaporation portion 141. Thus, magnetic characteristics of a film are improved by increasing evaporation rate of the evaporation portion 140. However, if a total power of the electron beam for the evaporation source 120 is kept constant, the running speed of the substrate 100 is decreased to obtain a desired film thickness.

Figure 2:
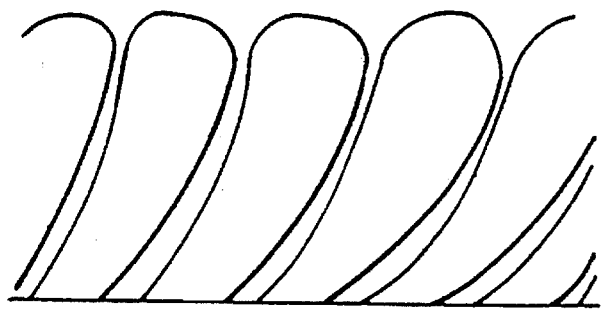
FIG. 2 is a schematic sectional view of a magnetic film prepared with the apparatus shown in FIG. 1.
Figure 12:
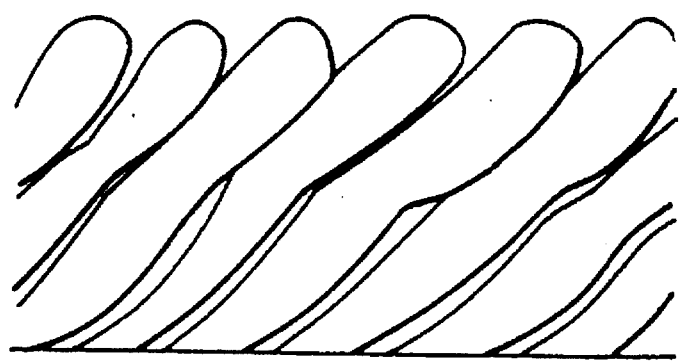
FIG. 12 is a sectional view of a structure of columnar gains prepared with normal incidence deposition in the fourth embodiment.

Columnar gains of the films formed in the embodiment and in the comparison example are shown schematically in FIGS. 12 and 2, respectively. It is apparent that columnar gains grow more straightly in the films of the embodiment than those in the comparison example. This means that incident angle is kept almost constant substantially in the examples though the aperture width is wide. The difference of $K_u$ is ascribed to the shape of the columnar gains. If still resistance is compared between the two examples, the still resistance of the films of the examples of the embodiment is 60 minutes or more, while that of the film of the comparison example is 10 minutes or less. This is ascribed to the surface smoothness and the packing factor which are much better than the counterparts of the film of the comparison example because an amount of oxygen introduced in the present embodiment is very small.

Figure 13:
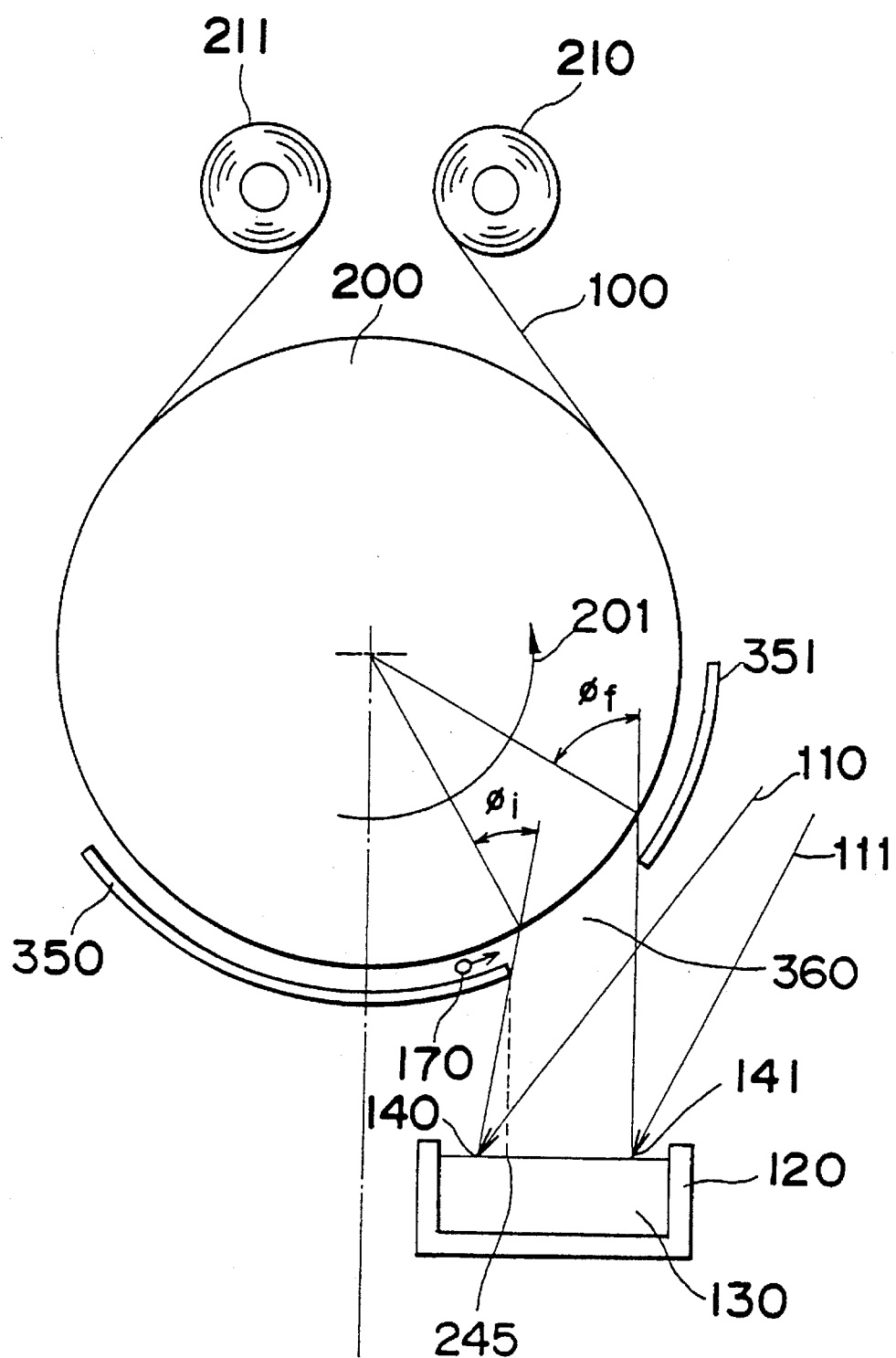
FIG. 13 is a sectional view of a vacuum deposition apparatus inside a vacuum chamber used for a manufacturing method of magnetic recording medium of a fifth embodiment of the invention.

A still different approach which applies two evaporation portions to oblique incidence deposition is explained with reference to FIG. 13 which shows a vacuum deposition apparatus inside a vacuum chamber used for performing a manufacturing method of magnetic recording medium of a fifth embodiment of the invention. The apparatus shown in FIG. 13 is quite similar to that shown in FIG. 10 except that an arrow 201 denoting the running direction of a substrate 100 is reversed. That is, the apparatus is operated differently on forming a film. Therefore, $\phi_i$ and $\phi_f$ are interchanged when compared with those shown in FIG. 10. Further, a roll 210 for supplying the substrate in FIG. 10 plays a role of a winding roll in FIG. 13, while a roll 211 for winding in FIG. 10 plays a role of a supply roll in FIG. 13.

Next, a film produced by the above-mentioned method is explained. The film is quite different on mechanical characteristics and erosion resistance from that produced with the prior art method shown in FIG. 1. In the prior art method shown in FIG. 1, mechanical characteristics and erosion resistance are large problems for a film produced with the method with the reverse running direction, and it is difficult to complete to form a magnetic recording medium. On the contrary, a film produced with the method of this embodiment is similar to that formed in the fourth embodiment. This is ascribed to a substantially small change in incident angle from the start to the end of film growth. A characteristic of a film produced with the method of this embodiment is that sizes of columnar grains are relatively homogeneous from an interface with the substrate to a film surface and that they are small. This is ascribable to that at the start of film growth the incident angle is smaller or the deposition rate is lower. Therefore, larger grains are difficult to grow at the start of film growth. Then, deposition proceeds further gradually at higher incident angle which means a lower deposition rate. On the contrary, in cases of the running direction of the substrate 100 shown in FIGS. 10 and 1, at the start of film growth the incident angle is larger or the evaporation rate is higher. Therefore, small gains grow at the start of film growth, and as deposition proceeds further gradually at lower incident angle which means a higher deposition rate to increase grain sizes. Especially in the prior method shown in FIG. 1, this tendency is stronger Smaller grain sizes make noises in a magnetic recording medium smaller.

Partially oxidized cobalt films arm formed in the same conditions of the example of the embodiment and the comparison example prepared in the fourth embodiment by reversing the running direction of the substrate. The running speed of the substrate 100 is controlled to have a thickness of about 0.15 μm of the films. In order to realize a saturation magnetization similar to that of the film of the example of the fifth embodiment, it is needed to supply oxygen of an amount four times that of the example of the fifth embodiment, as in the fourth embodiment.

The partially oxidized Co films of the example of this embodiment and the comparison example are evaluated by a magnetic anisotropy energy $K_u$. The partially oxidized Co film of the embodiment has $K_u$ of $2.7 \times 10^6$ erg/cc, while that the comparison example has $K_u$ of $0.8 \times 10^6$ erg/cc. The value of the example of this embodiment is about the same as that of the example in the fourth embodiment, while that of the comparison example is much lower than that the counterpart in the fourth embodiment. This is considered as follows: In the comparison example in the fourth embodiment, an effect of self-shadowing at the start point of film growth continues to the end point, while in the comparison example in this embodiment, an effect of self-shading is small so that magnetic separation of grains in a whole film becomes insufficient. In the film of the example of the embodiment, the easy axis of magnetization is about 60° relative to the film normal, while it is about 45° relative to the normal. The difference of these values from the counterpart in the fourth embodiment may be due to a difference in self-shadowing effect. In order to realize $K_u$ of the same order of the embodiment by using only one evaporation portion in the comparison example, the initial incident angle $\phi_i$ is increased. However, $K_u$ of the same order as that of the example of the embodiment cannot be obtained.

A partially oxidized cobalt film as a second example is formed in the same conditions as the embodiment by using 2:1 of a ratio of an irradiation time of the electron beam at the evaporation portion 140 to that at the evaporation portion 141. The film prepared in this method has $K_u$ of $2.9 \times 10^6$ erg/cc which is better than the first example of the embodiment. This is ascribable to an increase in effective incident angle compared with the example because evaporation rate at the evaporation portion 140 becomes larger than that at the evaporation portion 141. Thus, magnetic characteristics of a film are improved by increasing evaporation rate of the evaporation portion 140. However, if a total power of the electron beam for the evaporation source 120 is kept constant, the running speed of the substrate 100 is decreased to obtain a desired film thickness, as noted above.

Figure 14:
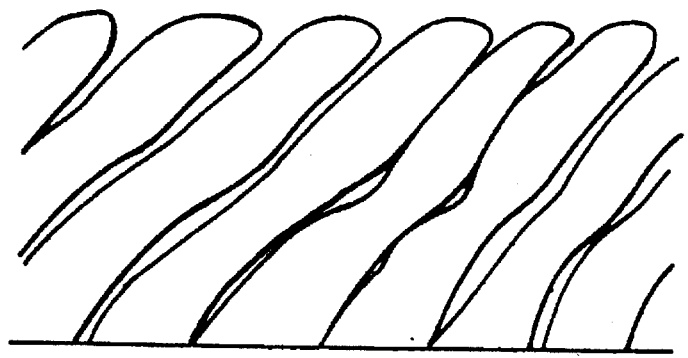
FIG. 14 is a sectional view of a structure of columnar gains prepared with normal incidence deposition in the fifth embodiment.
Figure 15:
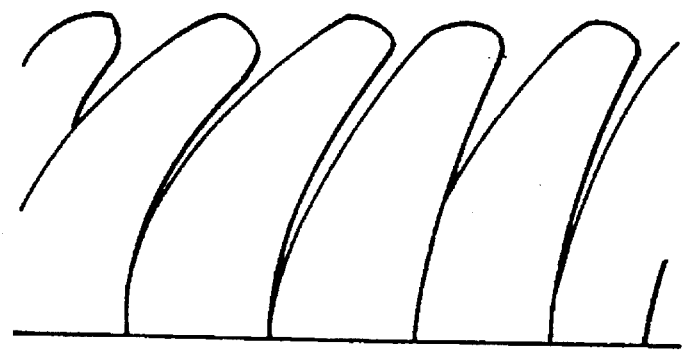
FIG. 15 is a sectional view of a structure of columnar gains prepared with normal incidence deposition in a prior art.

Columnar grains of the films formed in this embodiment and in the comparison example are shown schematically in FIGS. 14 and 15, respectively. It is apparent that columnar grains grow more straightly in the films of the embodiment than those in the comparison example. This means that incident angle is kept almost constant substantially in the examples in the embodiment though the aperture width is wide. If still resistance is compared between the examples of the embodiment and the comparison example, the still resistance of the films of the embodiment is 60 minutes or more, while that of the film of the comparison example is 1 minute or less. This is ascribed to the surface smoothness and the packing factor which are much better than the counterparts of the film of the comparison example because an amount of oxygen introduced in the embodiment is very small.

Read/write characteristics are evaluated of the partially oxidized cobalt films formed in the fourth and fifth embodiments with oblique incidence deposition. The evaluation used a commercial 8 mm video cassette recorder, and C/N at recording frequency of 7 MHz is evaluated and compared. Measured data show that C/N of the fourth and fifth embodiments are of the same order each other. However, the magnetic layer of the example of the fourth embodiment has a output level higher by +1 dB than the counterpart of the example of the fifth embodiment produced by reversing the running direction of the substrate, while noise level of the former is also higher by +1 dB than the latter. As to C/N of the magnetic layer of the two comparison examples, when expressed relative to the C/N of the fifth embodiment, the magnetic layer of the comparison example in the fourth embodiment is about −5 dB, while that in the fifth embodiment is about −7 dB. Therefore, a magnetic recording medium having superior read/write characteristics can be manufactured by using the apparatus and method of this embodiment.

Though partially oxidized Co—Cr and Co films are described above, the present invention is also advantageous for other Co-based alloy thin films or oxide thin films. Further, though only a mono-layer magnetic layer is explained, it is well known to iterate the same method to form a multilayer magnetic layer so as to have a high C/N. This also holds for the present embodiment.

In a sixth embodiment which applies the two evaporation portions to oblique incidence deposition, a film is formed by using the above-mentioned methods of the fifth embodiment and the fourth embodiment successively, to form a two-layer magnetic layer. Because the apparatuses shown in FIGS. 10 and 13 for the two embodiments have the same structures as each other, it can be regarded as the same apparatus. It improves productivity of manufacturing magnetic recording media to form a multi-layer film by reversing the running direction, and this uses methods of the invention described above more effectively. That is, columnar grains can be aligned in the same directions so that columnar grains can be regarded almost linear as to magnetic layers at the bottom and top, without rewinding a substrate 100 on which a lower magnetic layer as a bottom layer has already been formed.

First, a partially oxidized cobalt film of thickness of 0.05 µm is formed as a bottom magnetic layer with the method of the fifth embodiment. Then, on the film explained above, a partially oxidized cobalt film is formed as a top magnetic layer with the method of the fourth embodiment with a reverse running direction to the fifth embodiment, so as to form a two-layer film of total thickness of 0.1 µm.

Read/write characteristics of the two-layer film are evaluated as explained above. Then, the output level is found to be of the same order as that of the magnetic layer of the example of the fourth embodiment. However, C/N is improved by +1 dB as noise level are reduced to −1 dB.

As explained above, a magnetic recording medium of good magnetic and reproduction characteristics can be provided by using the method of the embodiment. This embodiment is also advantageous for a substrate on which an underlayer is already formed.

Figure 16:
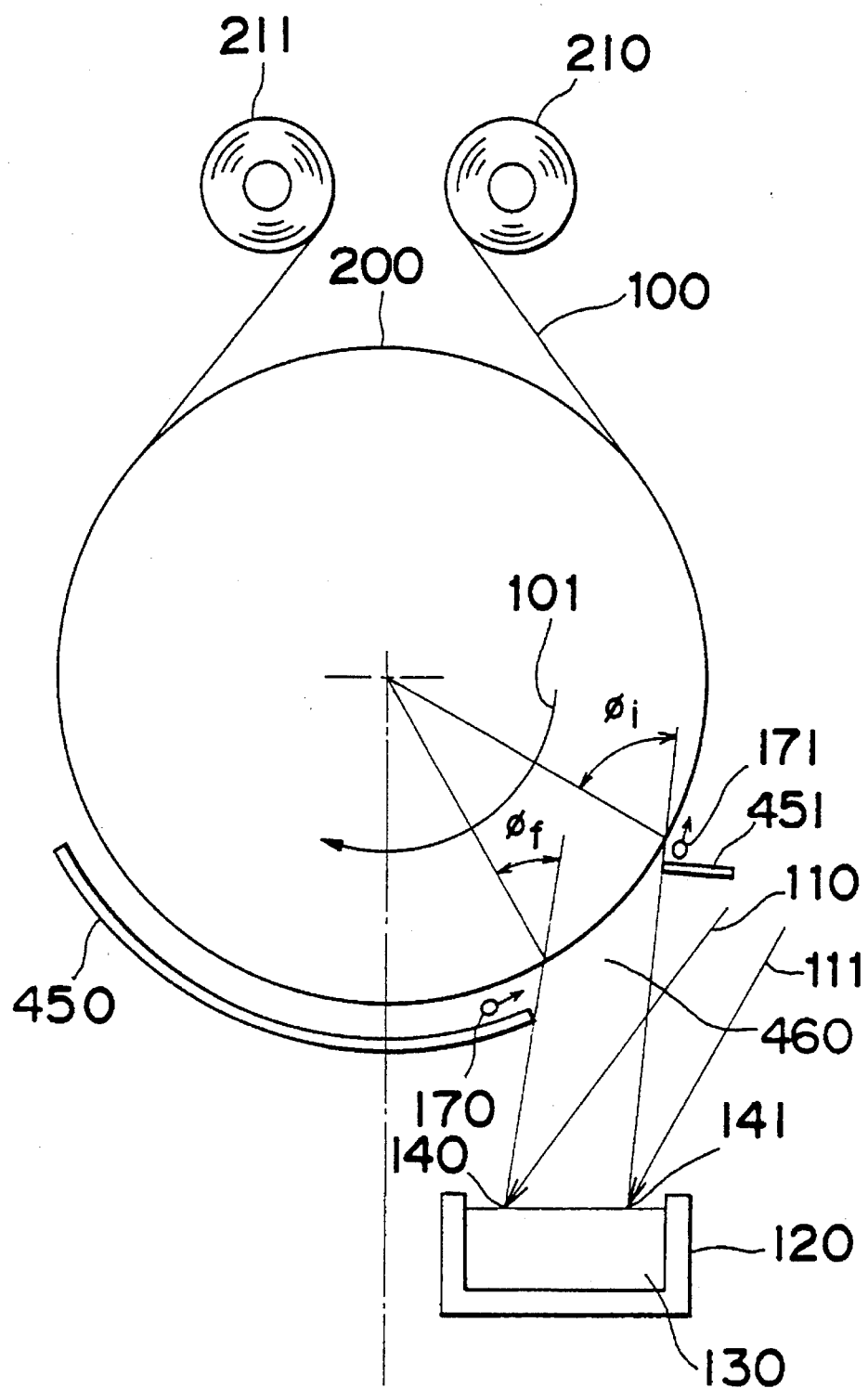
FIG. 16 is a sectional view of a vacuum deposition apparatus inside a vacuum chamber used for a manufacturing method of magnetic recording medium for a sixth embodiment of the invention.

A seventh embodiment which applies the two evaporation portions to oblique incidence deposition is explained With reference to FIG. 16, which shows schematically a vacuum deposition apparatus inside a vacuum chamber used for a manufacturing method of magnetic recording medium. A feature of the apparatus shown in FIG. 16 is that a nozzle 171 is provided for introducing oxygen in upstream side along the running direction of a substrate 100 relative to a shielding plate 451 for defining initial incidence. Generally, if a gas such as oxygen is introduced to a region of the initial incidence in an aperture 460 defined between two shielding plates 450 and 451, crystal growth at the region is disturbed, so that a film of low crystallinity is formed. This is mainly ascribed to the introduced gas which penetrates to the aperture 460.

On the other hand, if a partially oxidized film as a magnetic layer of Co—O film including mainly cobalt and oxygen or a partially oxidized film of Co—Ni—O film including mainly cobalt, nickel and oxygen is formed on an oxide film of a CoO film or CoNio film as an oxide film, a coercive force is increased and crystalline alignment is improved. If these properties are improved by using the prior art method, two steps of forming a Co—O film as an underlayer and of forming a Co—O film as a magnetic layer are needed, and this deteriorates productivity. The present invention performs the two steps in a single step, to satisfy both productivity and improvement of film characteristics. That is, by introducing oxygen to the region for initial incidence, a film at the initial stage of film growth is oxidized locally so as to make the film at the initial stage play a role of the above-mentioned oxide underlayer.

In order to attain the above-mentioned object, it is important to prevent the penetration to the aperture of oxygen introduced to the region of initial incidence and to suppress its effect. A nozzle 171 for introducing oxygen is provided in upstream side along the running direction of a substrate 100 relative to a shielding plate 451 for limiting the initial incidence. A direction of the nozzle 171 is along upstream direction so as to prevent the indirect flow towards the aperture 460. It is preferable that an oxygen flow from the nozzle 171 is converged.

Figure 17:
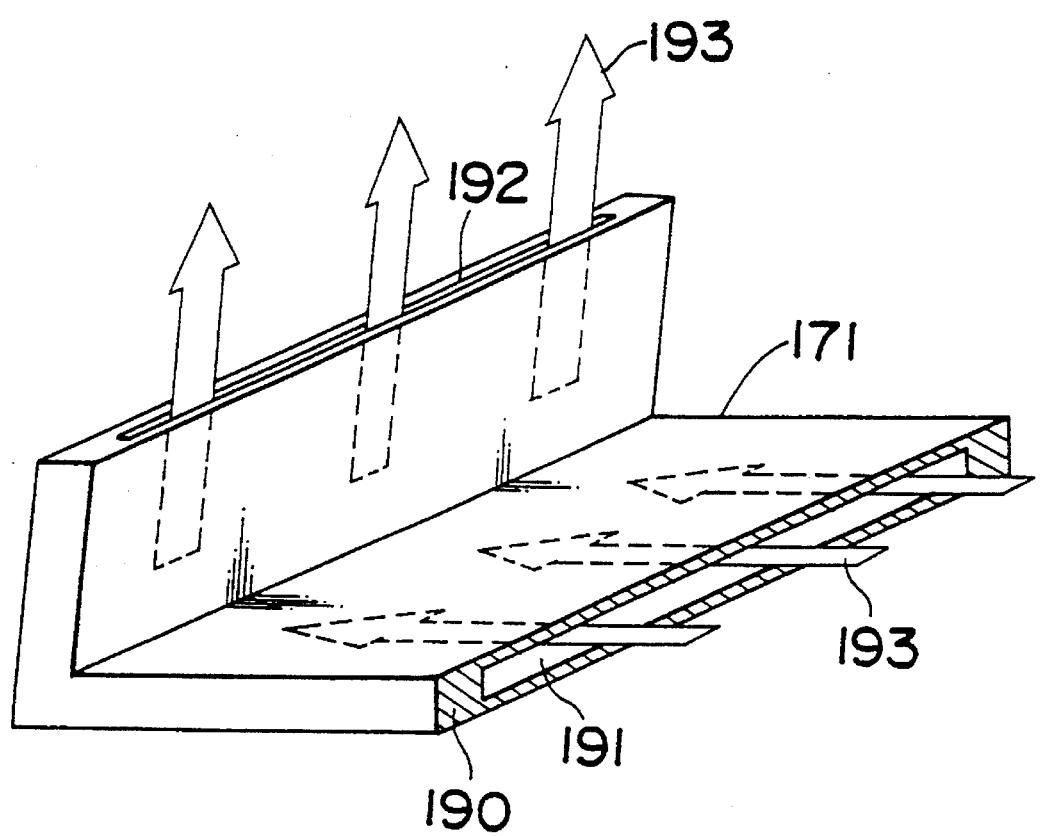
FIG. 17 is a perspective view of a nozzle for introducing oxygen for a seventh embodiment of the invention.

FIG. 17 shows a nozzle 171 schematically for introducing oxygen which can converge an oxygen flow. A hatched section 190 is connected to a pipe (not shown) for introducing oxygen. Oxygen 193 is carried from the pipe through the guide path 191 and comes out through a slit 192 into vacuum. The reference numeral 193 shows the oxygen flow schematically. When a gap of the slit is smaller sufficiently than the guide length, as shown in FIG. 17, the oxygen flow is converged. The nozzle 171 is bent for convenience of setting though the bending is not needed for the convergence of oxygen flow.

Figure 18:
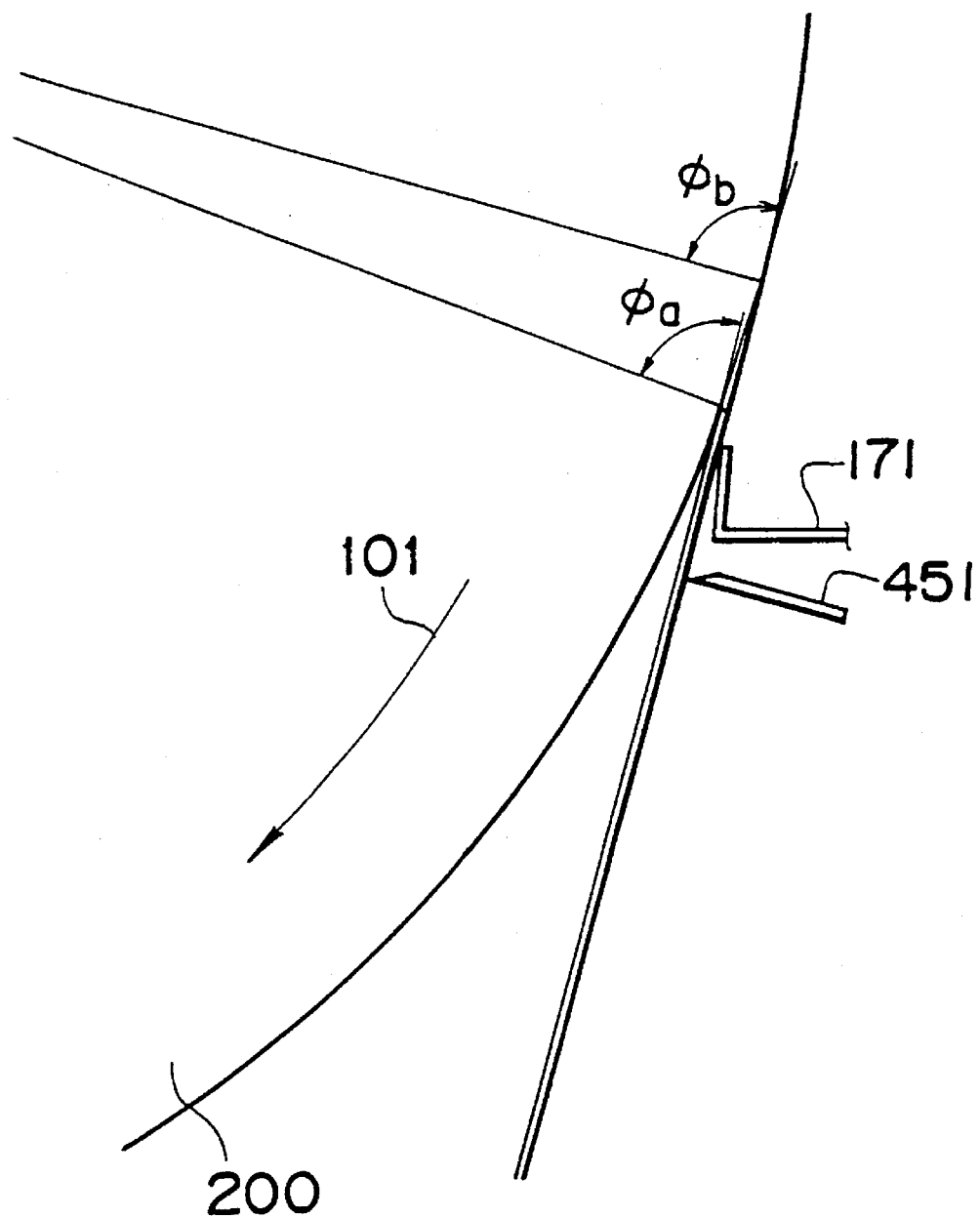
FIG. 18 is an enlarged sectional view of a region of film deposition.

FIG. 18 shows a situation around an initial point of film growth schematically for illustrating how the nozzle 171 is arranged. The nozzle 171 is arranged so that converged oxygen flow directs to an upstream side. A desirable direction of the converged oxygen flow is explained further. A shielding plate 451 is provided so that incident angle of evaporated atoms is $\phi_b$, which is 90° in FIG. 18. A converged oxygen flow from the nozzle 171 is introduced to a point where incident angle of evaporated atoms is $\phi_a$ ($\phi_a<\phi_b$). In FIG. 8, $\phi_a=85°$. Then, a part having incident angle of $\phi_a$ or more is affected strongly by the converged oxygen flow. For example, if evaporated atoms are made of cobalt, a part thereof having incident angle of $\phi_a$ or more is oxidized to form an oxide. In the drawing, evaporated atoms does not exceed a point of incident angle $\phi_b$. However, because evaporated atoms are scattered actually, they exceed the point to be deposited on the substrate in an upstream side. Such a deposition is also oxidized, and this serves to improve film quality. Thus, the initial incident angle $\phi_i$ of the invention corresponds to $\phi_a$.

An amount of oxygen to be introduced from the nozzle 171 to the region of the initial incidence is at most a third of the amount of oxygen from the nozzle 170 because a density of evaporated atoms there is small. A fifth thereof is appropriate because indirect flow of oxygen towards the region of crystal growth increases with an increase in an amount of supplied oxygen. However, the amount of supplied oxygen cannot be determined uniquely because it depends on a size of the apparatus and an evacuation rate therefrom.

Even if the above-mentioned means is adopted, it is difficult to prevent indirect oxygen flow towards the region of film growth and to suppress its effect completely. Then, in order to evacuate excess oxygen fast, the shielding plate 451 is made of a plate and its surface is arranged so as not to oppose the substrate 100 on the cylindrical drum 200 so as to increase the evacuation rate in the initial incidence region. It is more important to widen a distance between the shielding plates 450 and 451. This may decrease the effect of indirect flow on the entire region of film growth. The arrangement of wide aperture width of the embodiment by using two evaporation portions in the evaporation source is very advantageous. On the contrary, in the prior art shown in FIG. 1, the widened aperture simply decreases the incident angle, and the film quality cannot be improved by changing the incident angle.

Next, an example of a deposition tape produced by using the vacuum deposition apparatus of the seventh embodiment. A diameter of the cylindrical drum 200 is 1.5 m, and a polyethylene telephthalate film of tape thickness of 7 µm is used as the substrate 100. Cobalt is used as the evaporation material 130. A distance between the evaporation portions 140 and 141 is set about 30 cm. The shielding plate 451 is arranged so that $\phi_b$ in FIG. 18 is 90°, while the oxygen flow from the nozzle 171 is arranged so that $\phi_a$ in FIG. 18 is 85°. On the other hand, the shielding plate 450 is arranged so that $\phi_f$ is 50°. A aperture width between the two shielding plates 450 and 451 is about 50 cm. Oxygen is introduced from the nozzle 170 at a ratio of 1.0 liter/min. Oxygen is also introduced from the nozzle 171 at ratios of 0.5, 0.3, 0.2 and 0.1 liter/min for samples 1-1, 1-2, 1-3 and 1-4, respectively.

Samples produced as explained above are cut as tapes, and read/write characteristics are evaluated at recording wavelength of 0.5 µm by using a ring magnetic head with a gap length of 0.15 μm made of Sendust. Measured data show that C/N of the sample 1-3 is highest on output level (C) and output/noise (C/N). The C and C/N data of the other samples are represented by using those of the sample 1-3 as a standard, as follows: −2.5 dB and −1.1 dB for the sample 1-1, −1.1 dB and −0.2 dB for the sample 1-2 and −2.0 dB and −3.9 dB for the sample 1-4. If an amount of oxygen introduced from the nozzle 171 is too large, noise is decreased, whereas the output is also decreased because excess oxygen decreases a saturation magnetization. On the other hand, if an amount of oxygen introduced from the nozzle 171 is too small, noise is increased because the coercive force is decreased, whereas the output is also decreased.

In the above-mentioned examples of magnetic tape, only a magnetic layer made of a single layer is explained. However, a magnetic layer may be made of two or more layers. It is knows that a multi-layer structure makes magnetic domains in the magnetic layer stall to decrease noise. If a magnetic layer is made of two or more layers, the incident angles, the amount of oxygen to be introduced and a film thickness are controlled for each layer, so that desired characteristics is realized for an entire film.

When a magnetic layer having a multi-layer structure is produced by a conventional method, deposition has to be repeated as many times as the number of the layers, and this decreases productivity. In an eighth embodiment explained below, a magnetic layer of two-layer structure can be prepared in a one run of a substrate. Thus, a magnetic layer of superior quality can be produced according to the eighth embodiment.

An eighth embodiment of a manufacturing method of magnetic recording medium is explained with reference to FIG. 19 which shows schematically a vacuum deposition apparatus inside a vacuum chamber used for the manufacturing method of magnetic recording medium for the eighth embodiment. This apparatus has two evaporation sources 520, 521. A substrate 100 supplied from a supply roll 210 runs on a circumference of a cylindrical drum 200, and it is wound by a roll 211. On the substrate 100, a lower magnetic layer is formed at a second aperture 561 defined between shielding plates 553 and 552 by using the evaporation source (second evaporation source) 521, while an upper magnetic layer is formed next at a first aperture 560 defined between shielding plates 551 and 550 including an evaporation source (first evaporation source) 520. In the evaporation sources 521 and 520, cobalt or a Co—Ni alloy is filled as an evaporation material 530 and 531. The evaporation sources 521 and 520 are arranged at the same side in the upstream side along a running direction of the substrate relative to a vertical line through a center of the cylindrical drum 200.

In the evaporation source 521 in the second aperture 561, an evaporation portion 542 is provided. In FIG. 19, an evaporation portion 542 is provided in the evaporation source 521 in order not to enlarge a scale of the apparatus. Evaporated atoms from the evaporation portion 542 are restricted by the shielding plate 553 on the initial incident angle $\phi_{i2}$ and by the shielding plate 552 on the final incident angle $\phi_{f2}$. It is preferable that the initial incident angle $\phi_{i2}$ is 85° or less and the final incident angle $\phi_{f2}$ is 50° or more. If the initial incident angle $\phi_{i2}$ is more than 85°, degree of crystal orientation of the film becomes low, while if the final incident angle $\phi_{f2}$ is less than 50°, the coercive force decreases. A nozzle 172 is provided between the shielding plate 552 and the cylindrical drum 200 to introduce oxygen towards the second aperture 561. A rear end of the shielding plate 552 has a hook-like shape in order to suppress indirect flow of oxygen from the nozzle 172 towards the downstream side. On the other hand, the shielding plate 553 is a plate which does not oppose to the substrate 100 on the cylindrical drum 200 so as to enhance an evacuation rate of the region. Further, the evaporation source 521 is located above the first aperture 560 so as not to prevent evacuation from the initial incident region in the first aperture 560.

The structure of the first aperture 560 is the same as that 460 shown in FIG. 16. By providing two evaporation portions 540 and 541 in the evaporation source 520 along the running direction of the substrate 100, the aperture 560 can be expanded than previously, and this improves productivity. It is preferable that the initial incident angle $\phi_{i2}$ is 85° or less and the final incident angle $\phi_{f2}$ is 50° or more to have a sufficient coercive force in the magnetic layer. Oxygen is introduced by the nozzle 170 similarly to the prior art method. The nozzle 171 is explained later.

When a magnetic layer is manufactured as explained above, it is set so that the film thickness of the top magnetic layer is thicker than that of the bottom one. A ratio of the top magnetic layer is preferable between 60 and 80% in the entire magnetic layer. This is because the bottom magnetic layer is treated as an underlayer of the top magnetic layer with respect to crystal growth. Read/write characteristics can be improved by forming a main top magnetic layer on the thin bottom magnetic layer as the underlayer. It is very convenient that the thick top magnetic layer is formed at the first aperture 560 where the productivity is high.

As explained above, characteristics of the magnetic layer can be improved by using the above-mentioned apparatus. Next, introduction to oxygen by the nozzle 171 is explained. The structure of the first aperture 560 is almost the same as that shown in FIG. 16, including the arrangement of the evaporation source 520 and the nozzle 171. The shape and the direction and the supply of oxygen are similar to those shown in FIGS. 17 and 18. In the above-mentioned structure, oxygen is introduced by the nozzle 171 on forming a magnetic layer of two-layer structure because of the reasons explained below.

A region of initial layer portion of the top magnetic layer formed in the first aperture 560 is oxidized locally. However, it is noted that the initial layer portion is not used as the underlayer of an oxide film as in the seventh embodiment. The initial layer portion plays a role as a magnetic separation layer to weaken magnetic coupling between the top and bottom magnetic layers. Noise can be reduced by providing the magnetic separation layer. The initial layer portion oxidized as the magnetic separation layer has to be thinner than the underlayer. Therefore, when the initial incident angle $\phi_{i1}$ is set, the shielding plate 551 and the nozzle 171 for introducing oxygen are arranged so that $\phi_a$ and $\phi_b$ in FIG. 18 are equal to each other. Evaporated atoms to be oxidized at this time are scattered atoms reaching the substrate 100. Therefore, the amount of oxygen to be introduced is small.

It is preferable that the initial incident angle $\phi_{i2}$ is 85° or less, and the final incident angle $\phi_{f2}$ is 50° or more to have a sufficient coercive force in the magnetic layer. An amount of oxygen introduced by the nozzle 171 is small as mentioned above. It is at most 1/20, preferable 1/50, of the amount of oxygen introduced by the nozzle 170. However, it cannot be determined uniquely because the amount depends on the size of the apparatus and the evacuation rate. If oxygen for the bottom magnetic layer enters indirectly, it becomes difficult to control the magnetic layer by introducing oxygen by the nozzle 171. Then, it is important, for example, that the shielding plate 552 has a hook-like shape as shown in FIG. 19 or that it may be located near the cylindrical drum 200.

When a magnetic layer is manufactured as explained above, it is set so that the film thickness of the top magnetic layer is thicker than that of the bottom one, as in the above-mentioned two-layer structure without introducing oxygen by the nozzle 171. A ratio of the top magnetic layer is preferable between 60 and 80% in the entire magnetic layer.

Next, an example of a deposition tape produced by using the vacuum deposition apparatus of the eighth embodiment is explained. Cobalt is used as the evaporation materials 530 and 531. The shielding plates 553 and 552 defining a second aperture 561 are arranged so that $\phi_{i2}$ and $\phi_{f2}$ are 85° and 50°, while the shielding plates 551 and 550 are arranged so that $\phi_{i1}$ and $\phi_{f1}$ in the first aperture 560 are 85° and 50°. A distance between the two evaporation portions 540 and 541 is set as about 30 cm as in the seventh embodiment. The nozzle 171 is arranged so that converged oxygen flow directs towards a position where the incident angle of evaporated atoms is $\phi_{i1}$. In the above-mentioned structure, a magnetic layer of two-layer structure is manufactured wherein the thickness of the bottom layer is 0.03 μm and that of the top layer is 0.07 μm. Oxygen is introduced from the nozzle 172 at the second aperture 561 at a ratio of 0.3 liter/min. Oxygen is introduced from the nozzle 170 at the first aperture 560 at a ratio of 1.0 liter/min. Oxygen is also introduced from the nozzle 171 at ratios of 0, 0.02, 0.05 and 0.1 liter/min for samples 2-1, 2-2, 2-3 and 2-4, respectively.

Samples produced as explained adore are cut as tapes, and read/write characteristics are evaluated at recording wavelength of 0.5 μm similarly to in the seventh embodiment. Measured data show that C/N of the sample 2-2 is highest on output (C) and output/noise (C/N). The C and C/N data of the other samples are represented by using those of the sample 2-2 as a standard, as follows: +0.5 dB and −0.5 dB for the sample 2-1, −0.8 dB and −0.3 dB for the sample 2-3 and −2.2 dB and −1.8 dB for the sample 2-4. If the sample 1-3 in the seventh embodiment is compared with the sample 2-2 in this embodiment, the sample 2-2 is superior by 1 dB both on C and C/N. This is ascribed to an effect of the two-layer structure. The sample 2-1 without introducing oxygen from the nozzle 171 has a high reproduction output, but it also has high noises. However, if the simple 2-1 is compared with a comparison example explained below, it is superior by 3 dB or more both on C and C/N. There is a tendency that samples produced by introducing oxygen from the nozzle 171 has a smaller output with increasing an amount of introduced oxygen. The output decreases much if the amount of introduced oxygen is too much. This is ascribed to a decrease in saturation magnetization, and especially to deterioration of crystal orientation due to indirect flow of excess oxygen towards a film growth portion.

Figure 1:
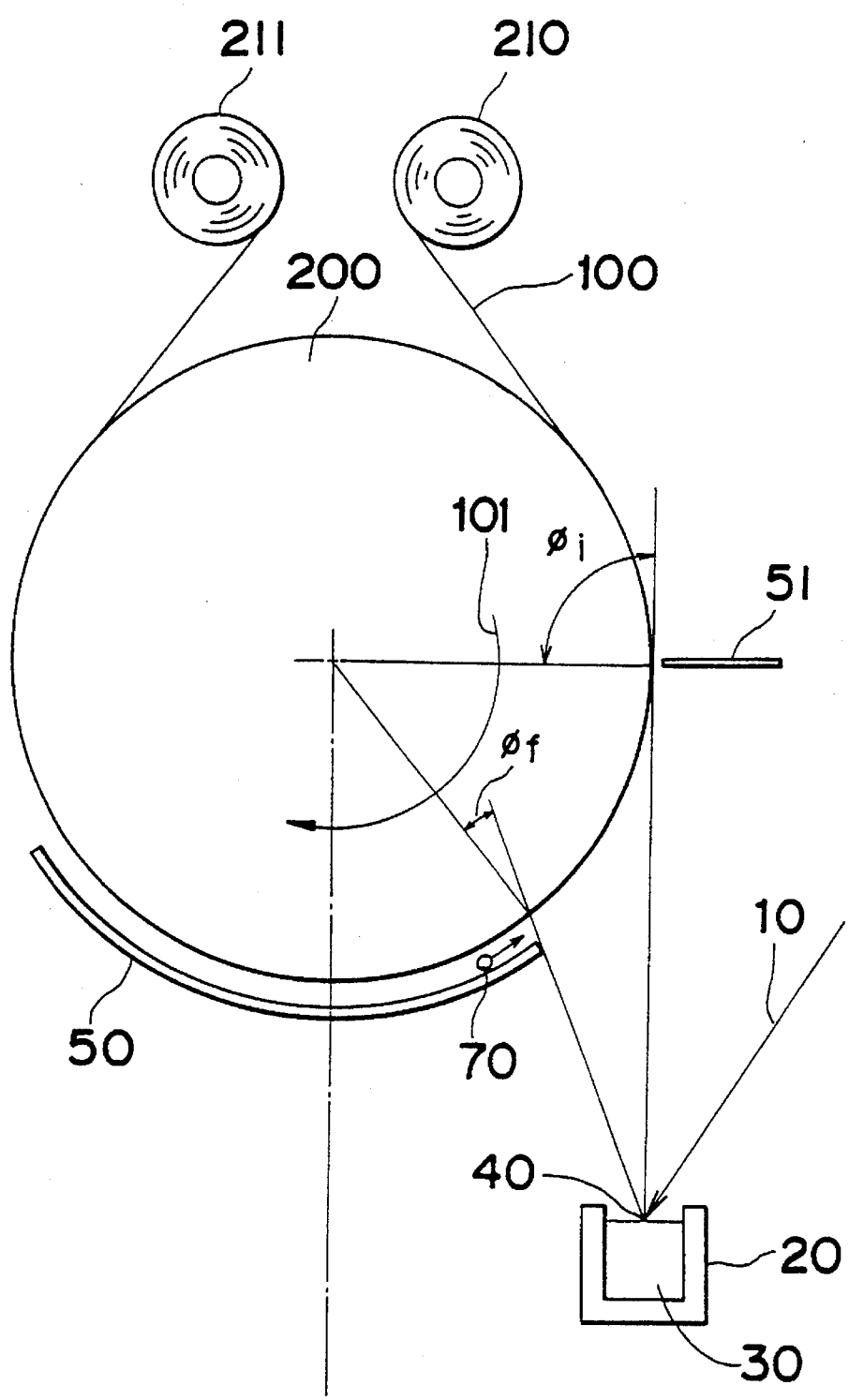
FIG. 1 is a schematic diagram of a prior art deposition apparatus for oblique incidence deposition of a magnetic layer.

As a comparison example, a magnetic layer is formed with the prior art method. The prior art vacuum deposition apparatus shown in FIG. 1 is used. Cobalt is used as the evaporation material 30. The shielding plates 51 and 50 are arranged so that $\phi_i$ and $\phi_f$ are 90° and 30°. An aperture width between the shielding plates 51 and 50 is about 50 cm similarly to that in the seventh embodiment. In the above-mentioned structure, a magnetic layer of film thickness of 0.1 μm is manufactured. Oxygen is introduced from the nozzle 70 at ratios of 1.5, 1.8 and 2.0 liter/min for samples H1-1, H1-2 and H1-3, respectively.

The samples produced as explained above are cut as tapes, and read/write characteristics are evaluated at recording wavelength of 0.5 μm similarly to in the seventh embodiment. Measured data show that C/N of the sample H1-2 is highest on reproduction output (C) and reproduction output/ noise (C/N). If the sample H1-2 is compared with the sample 1-3 in the seventh embodiment, the former is inferior by −4 dB both on C and C/N. This is ascribed to an effect of a small final incident angle, though the same aperture is adopted, and the low coercive force. Further, the crystalline alignment is also considered to be deteriorated due to indirect flow of oxygen introduced in the end portion of film growth towards the start portion of film growth, because an amount of introduced oxygen is large.

Figure 20:
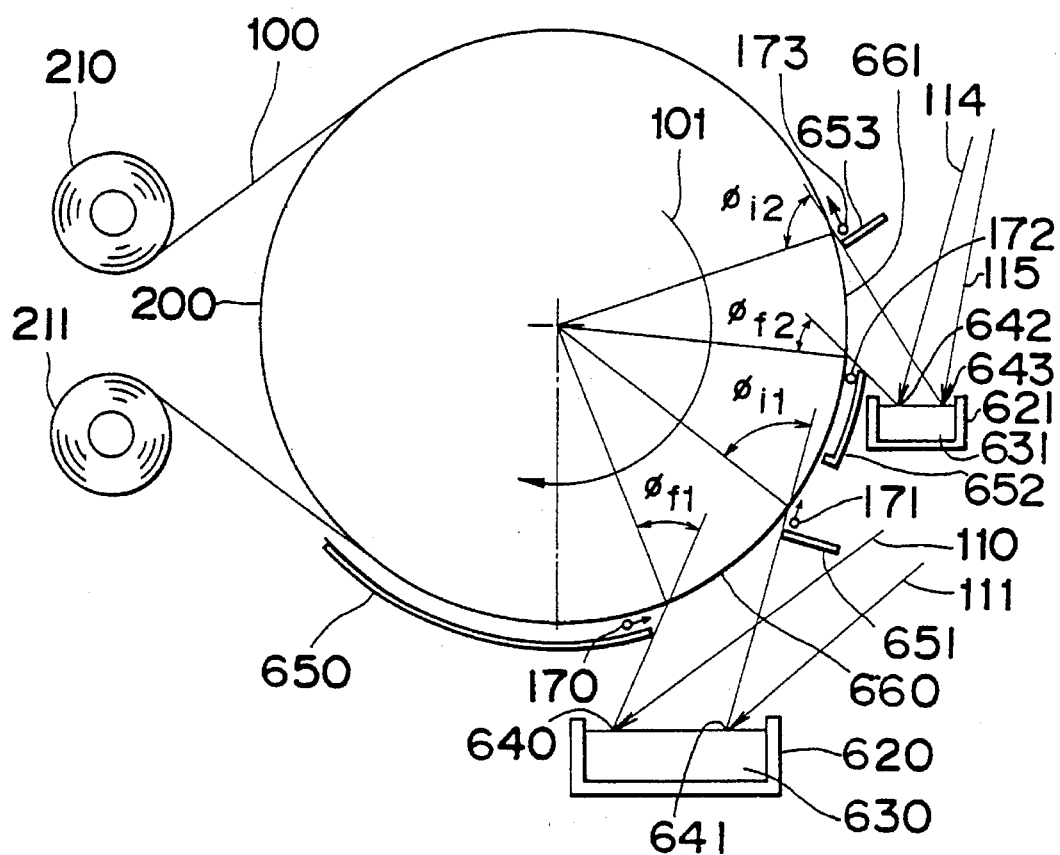
FIG. 20 is a schematic sectional view of a vacuum deposition apparatus inside a vacuum chamber used for a manufacturing method of magnetic recording medium for a ninth embodiment of the invention.

An ninth embodiment of a manufacturing method of magnetic recording medium is explained with reference to FIG. 20 which shows schematically a vacuum deposition apparatus inside a vacuum chamber used for the manufacturing method of magnetic recording medium for the ninth embodiment. The apparatus has two evaporation sources 620, 621, and it is similar to that of the eighth embodiment except that two evaporation portions 642 and 643 are provided in the evaporation source 621. A substrate 100 supplied from a supply roll 210 runs on a circumference of a cylindrical drum 200, and it is wound by a roll 211. On the substrate 100, a lower magnetic layer is formed at a second aperture 661 defined between shielding plates 653 and 652 by using the evaporation source (second evaporation source) 621, while an upper magnetic layer is formed next at a first aperture 661 defined between shielding plates 651 and 650 for an evaporation source (first evaporation source) 620. In the evaporation sources 621 and 620, cobalt or a Co—Ni alloy is filled as an evaporation material 630 and 631.

Figure 19:
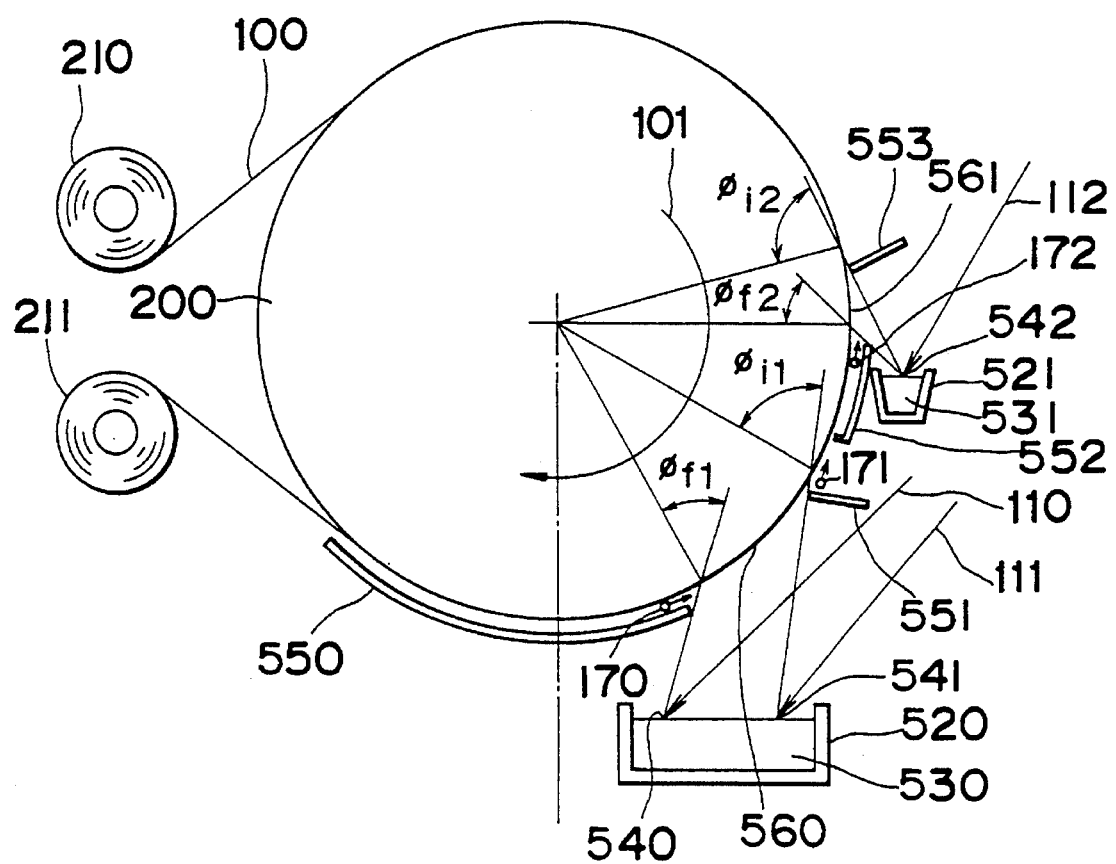
FIG. 19 is a schematic sectional view of a vacuum deposition apparatus inside a vacuum chamber used for a manufacturing method of magnetic recording medium in an eighth embodiment of the invention.

In the evaporation source 621 for the second aperture 661, two evaporation portions 642 and 643 are provided in contrast to the only evaporation portion 542 in the evaporation source 521 shown in FIG. 19. The evaporation source 621 is located above the first aperture 660 so as not to prevent evacuation from the initial incident region in the first aperture 660. A nozzle 173 similar to the nozzle 171 is provided in an upstream side relative to the shielding plate 653. Evaporated atoms from the evaporation portions 642 and 643 are restricted by the shielding plates 653 on the initial incident angle $\phi_{i2}$ and by the shielding plate 652 on the final incident angle $\phi_{f2}$. A nozzle 172 is provided between the shielding plate 652 and the cylindrical drum 200 to introduce oxygen towards the second aperture 661.

The size of the cylindrical drum, the incident angle of evaporated atoms, the distance between the evaporation portions, the amount of introduced oxygen, the film thickness are only given as examples, and they are not restricted to the above-mentioned values.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of manufacturing a magnetic recording medium by vacuum deposition, comprising:

moving a substrate in a vacuum;

providing two shielding members for defining an aperture;

providing an evaporation source having an evaporation material therein to be used for a magnetic layer, the evaporation source being located at a position such that evaporated atoms from the evaporation material pass through the aperture to adhere to the moving substrate; and irradiating the evaporation material at two evaporation locations on the evaporation source with electron beams;

wherein the evaporation locations are provided along a moving direction of the substrate, with respect to each other, on forming a deposition layer on the moving substrate; and wherein evaporated atoms from the two evaporation portions deposit onto the substrate to form a magnetic layer.

2. The method according to claim 1, comprising:

providing an underlayer on the surface of the substrate before depositing the magnetic layer thereon.

3. The method according to claim 1, wherein the moving a substrate in a vacuum further comprises:

moving the substrate on a circumferential surface of a rotatable cylindrical drum.

4. The method according to claim 3, further comprising:

providing the shielding members vertically below a center of a rotation axis of the rotatable cylindrical drum; and providing the evaporation source vertically below the center of the rotation axis and the shielding members, wherein the two evaporation locations are outside a vertical projection of the aperture on the evaporation material in an upstream side and in a downstream side along the moving direction of said substrate, respectively.

5. The method according to claim 3, further comprising:

providing the shielding members along the moving direction so that an incident angle of evaporated atoms to the substrate is greater at an end of the aperture at the upstream side of the moving direction of the substrate than at the downstream end of the aperture.

6. The method according to claim 5, further comprising:

placing the two evaporation locations in vertical alignment below the two ends of the aperture.

7. The method according to claim 5, further comprising:

evaporating the evaporation material in the evaporation location below the upstream end of the aperture at a higher evaporation rate than that at the evaporation location below the downstream end of the aperture.

8. The method according to claim 5, further comprising:

placing one of the two evaporation locations in vertical alignment with and below the upstream end of the aperture; and placing the other of the two evaporation locations relatively downstream of a position in vertical alignment beneath the downstream end of the aperture.

9. The method according to claim 8, further comprising:

evaporating the evaporation material in the other of the two evaporation locations at a higher evaporation rate than that at the one of the two evaporation locations.

10. The method according to claim 3, further comprising:

providing the shielding members along the moving direction so that an incident angle of evaporated atoms to the substrate is less at an end of the aperture in the upstream side of the moving direction of the substrate than at the downstream end of the aperture.

11. The method according to claim 10, further comprising:

placing one of the two evaporation locations relatively upstream of a position in vertical alignment beneath the upstream end of the aperture; and placing the other of the two evaporation locations in vertical alignment with and below the downstream end of the aperture.

12. The method according to claim 11, further comprising:

evaporating the evaporation material in the one of the two evaporation locations at a higher evaporation rate than that at the other of the two evaporation locations.

13. A method of manufacturing a magnetic recording medium by vacuum deposition, comprising:

moving a substrate in a vacuum;

providing two shielding members for defining an aperture, the shielding members being provided along the moving direction so that an incident angle of evaporated atoms to the substrate is less at an end of the aperture at the upstream side of the moving direction of the substrate than at the downstream end of the aperture;

providing an evaporation source having an evaporation material therein used for a magnetic layer, the evaporation source being located at a position such that evaporated atoms from the evaporation material pass through the aperture to adhere to the moving substrate;

irradiating the evaporation material at two evaporation locations on the evaporation source with two electron beams, wherein the evaporation locations are provided along a moving direction of the substrate on forming a deposition layer on the moving substrate, and wherein evaporated atoms from the two evaporation portions deposit onto the substrate to form a magnetic layer;

reversing the moving direction of the substrate; and irradiating the evaporation material at two evaporation locations on the evaporation source with two electron beams;

wherein the evaporation locations are provided along the moving direction of the substrate, with respect to each other, and evaporated atoms from the two evaporation portions deposit onto the substrate to form a top magnetic layer, whereby an incident angle of evaporated atoms to the substrate is higher at an upstream end of the aperture than at the downstream end of the aperture.

14. The method according to claim 13, further comprising:

placing one of the two evaporation locations relatively upstream of a position in vertical alignment beneath the upstream end of the aperture when the moving direction is in the direction for forming the bottom layer; and placing the other of the two evaporation locations in vertical alignment with and below the downstream end of the aperture when the moving direction is in the direction for forming the bottom layer.

15. The method according to claim 14, comprising:

providing an underlayer on the surface of the substrate before depositing the magnetic layer thereon.

16. A method of manufacturing a magnetic recording medium by vacuum deposition, comprising:

moving a substrate in a vacuum;

providing first and second shielding members for defining a first aperture, the two shielding members being provided along a moving direction of the substrate so that an incident angle of evaporated atoms to the substrate is greater at an upstream end of the first aperture than at the downstream end of the first aperture;

providing a first evaporation source having a first evaporation material therein used to deposit a magnetic layer, the first evaporation source being located at a position such that evaporated atoms from the first evaporation material pass through the first aperture to adhere to the moving substrate;

providing a first nozzle near said upstream end of the first aperture and a second nozzle near said downstream end of the first aperture;

supplying oxygen through the first and second nozzles; and irradiating the first evaporation material at two evaporation locations on the first evaporation source with two electron beams, wherein the evaporation locations are provided along the moving direction of the substrate, with respect to each other, on forming a deposition layer on the moving substrate; and wherein evaporated atoms from the two evaporation portions deposit onto the substrate to form a magnetic layer.

17. The method according to claim 16, wherein said supplying oxygen through said first nozzle comprises:

generating a flow of oxygen in the upstream direction.

18. The method according to claim 16, wherein said evaporation material comprises cobalt, or cobalt and nickel.

19. The method according to claim 16, further comprising:

providing third and fourth shielding members for defining a second aperture, the third and fourth shielding members being provided along the moving direction so that an incident angle of evaporated atoms to the substrate is greater at an upstream end of the second aperture than at the downstream end of the second aperture;

providing a second evaporation source having an evaporation material therein used for depositing a magnetic layer, the second evaporation source being located at a position such that evaporated atoms from the second evaporation material pass through the second aperture to adhere to the moving substrate, wherein an evaporation location on the second evaporation source is provided above said first evaporation source;

providing a third nozzle near said downstream end of the second aperture;

supplying oxygen through the third nozzle; and irradiating the second evaporation material at the evaporation location on the second evaporation source with an electron beam, wherein evaporated atoms from the evaporation portion on the second evaporation source deposit onto the substrate to form an oxide magnetic layer.

20. The method according to claim 19, further comprising:

providing a fourth nozzle near said upstream end of the second aperture; and supplying oxygen through the fourth nozzle.

21. The method according to claim 20, wherein said supplying oxygen through the fourth nozzle comprises:

generating a flow of oxygen in the upstream direction.

* * * * *